United States Patent
Wray

(10) Patent No.: US 9,144,131 B2
(45) Date of Patent: Sep. 22, 2015

(54) LIGHTING CONTROL SYSTEM AND METHOD

(71) Applicant: Donald L. Wray, Ocala, FL (US)

(72) Inventor: Donald L. Wray, Ocala, FL (US)

(73) Assignee: USAI, LLC, New Windsor, NY (US)

( * ) Notice: Subject to any disclaimer, the term of this patent is extended or adjusted under 35 U.S.C. 154(b) by 0 days.

(21) Appl. No.: 14/212,021

(22) Filed: Mar. 14, 2014

(65) Prior Publication Data

US 2014/0197754 A1    Jul. 17, 2014

Related U.S. Application Data

(63) Continuation of application No. 13/902,548, filed on May 24, 2013, now Pat. No. 8,742,695, which is a continuation of application No. 13/841,438, filed on Mar. 15, 2013, now abandoned, which is a continuation-in-part of application No. 13/712,371, filed on Dec. 12, 2012, now Pat. No. 8,456,109, which is a continuation-in-part of application No. 13/605,431, filed on Sep. 6, 2012, now Pat. No. 8,581,520.

(60) Provisional application No. 61/656,153, filed on Jun. 6, 2012, provisional application No. 61/646,652, filed on May 14, 2012.

(51) Int. Cl.
*H05B 33/08* (2006.01)

(52) U.S. Cl.
CPC ........ *H05B 33/0842* (2013.01); *H05B 33/0818* (2013.01); *H05B 33/0821* (2013.01); *Y02B 20/341* (2013.01); *Y02B 20/346* (2013.01)

(58) Field of Classification Search
USPC ......................................................... 315/217
See application file for complete search history.

(56) References Cited

U.S. PATENT DOCUMENTS

| | | | |
|---|---|---|---|
| 6,016,038 A | 1/2000 | Mueller et al. | |
| 6,094,014 A | 7/2000 | Bucks et al. | |
| 6,095,661 A * | 8/2000 | Lebens et al. | 362/184 |
| 6,150,774 A | 11/2000 | Mueller et al. | |
| 6,166,496 A | 12/2000 | Lys et al. | |
| 6,169,377 B1 * | 1/2001 | Bryde et al. | 315/294 |
| 6,211,626 B1 | 4/2001 | Lys et al. | |
| 6,234,648 B1 | 5/2001 | Borner et al. | |
| 6,292,901 B1 | 9/2001 | Lys et al. | |
| 6,340,868 B1 | 1/2002 | Lys et al. | |
| 6,459,919 B1 | 10/2002 | Lys et al. | |
| 6,528,954 B1 | 3/2003 | Lys et al. | |
| 6,548,967 B1 | 4/2003 | Dowling et al. | |
| 6,636,003 B2 | 10/2003 | Rahm et al. | |
| 6,692,136 B2 | 2/2004 | Marshall et al. | |
| 6,788,011 B2 | 9/2004 | Mueller et al. | |
| 6,806,659 B1 | 10/2004 | Mueller et al. | |

(Continued)

FOREIGN PATENT DOCUMENTS

CA    2302227 A1    3/1999

*Primary Examiner* — Jason M Crawford
*Assistant Examiner* — Nelson Correa
(74) *Attorney, Agent, or Firm* — St. Onge Steward Johnston & Reens LLC

(57) ABSTRACT

A lighting system provides for control of the perceived color of the light emitted by the light fixture. The light fixture has two light sources, a control circuit pulses the two light sources and changes relative duty cycles of the light sources to alter a perceived color output of the lighting fixture, in response to a control signal. Duty cycles of the light sources are a function of the control signal.

32 Claims, 16 Drawing Sheets

(56) References Cited

U.S. PATENT DOCUMENTS

| | | | |
|---|---|---|---|
| 6,888,322 B2 | 5/2005 | Dowling et al. | |
| 6,897,624 B2 | 5/2005 | Lys et al. | |
| 6,965,205 B2 | 11/2005 | Piepgras et al. | |
| 6,967,448 B2 | 11/2005 | Morgan et al. | |
| 7,014,336 B1 | 3/2006 | Ducharme et al. | |
| 7,023,147 B2 | 4/2006 | Colby et al. | |
| 7,038,399 B2 | 5/2006 | Lys et al. | |
| 7,064,498 B2 | 6/2006 | Dowling et al. | |
| 7,088,059 B2 | 8/2006 | McKinney et al. | |
| 7,161,311 B2 * | 1/2007 | Mueller et al. | 315/294 |
| 7,161,313 B2 | 1/2007 | Piepgras et al. | |
| 7,173,383 B2 * | 2/2007 | Vornsand et al. | 315/291 |
| 7,180,252 B2 | 2/2007 | Lys et al. | |
| 7,256,554 B2 | 8/2007 | Lys | |
| 7,262,559 B2 | 8/2007 | Tripathi et al. | |
| 7,274,160 B2 | 9/2007 | Mueller et al. | |
| 7,288,902 B1 | 10/2007 | Melanson | |
| 7,352,138 B2 | 4/2008 | Lys et al. | |
| 7,387,405 B2 | 6/2008 | Ducharme et al. | |
| 7,459,864 B2 | 12/2008 | Lys | |
| 7,462,997 B2 | 12/2008 | Mueller et al. | |
| 7,821,212 B2 | 10/2010 | Wray | |
| 8,018,172 B2 | 9/2011 | Leshniak | |
| 8,115,416 B2 * | 2/2012 | Steffen et al. | 315/307 |
| 8,143,813 B2 * | 3/2012 | Aarts | 315/307 |
| 8,258,722 B2 * | 9/2012 | Swoboda et al. | 315/308 |
| 8,278,830 B2 | 10/2012 | Archibald et al. | |
| 8,410,707 B2 * | 4/2013 | Teng et al. | 315/152 |
| 8,456,109 B1 * | 6/2013 | Wray | 315/307 |
| 8,508,139 B2 | 8/2013 | Baaijens | |
| 8,581,520 B1 * | 11/2013 | Wray | 315/307 |
| 8,638,045 B2 * | 1/2014 | Kunst et al. | 315/291 |
| 8,674,610 B2 * | 3/2014 | Briggs | 315/192 |
| 8,731,406 B2 * | 5/2014 | Rajagopal et al. | 398/130 |
| 8,742,695 B2 * | 6/2014 | Wray | 315/307 |
| 8,749,157 B2 * | 6/2014 | Ludorf | 315/224 |
| 2006/0028156 A1 | 2/2006 | Jungwirth | |
| 2006/0109219 A1 | 5/2006 | Robinson et al. | |
| 2006/0170370 A1 * | 8/2006 | De Anna | 315/185 S |
| 2008/0252197 A1 * | 10/2008 | Li et al. | 313/502 |
| 2009/0026913 A1 | 1/2009 | Mrakovich | |
| 2009/0224693 A1 | 9/2009 | Mukai et al. | |
| 2010/0141153 A1 | 6/2010 | Recker et al. | |
| 2010/0237803 A1 | 9/2010 | Wolf et al. | |
| 2010/0244740 A1 | 9/2010 | Alpert et al. | |
| 2011/0031890 A1 | 2/2011 | Stack | |
| 2011/0043134 A1 | 2/2011 | Lee | |
| 2011/0062888 A1 | 3/2011 | Bondy et al. | |
| 2011/0109248 A1 | 5/2011 | Liu | |
| 2011/0109249 A1 | 5/2011 | Liu et al. | |
| 2011/0115407 A1 | 5/2011 | Wibben et al. | |
| 2011/0164069 A1 | 7/2011 | Thompson et al. | |
| 2011/0210678 A1 | 9/2011 | Grajcar | |
| 2011/0248645 A1 | 10/2011 | Custodis | |
| 2012/0038291 A1 | 2/2012 | Hasnain | |
| 2012/0236553 A1 | 9/2012 | Cash | |
| 2012/0249000 A1 | 10/2012 | Kawai et al. | |
| 2013/0063042 A1 | 3/2013 | Bora et al. | |
| 2013/0141001 A1 * | 6/2013 | Datta et al. | 315/224 |

* cited by examiner

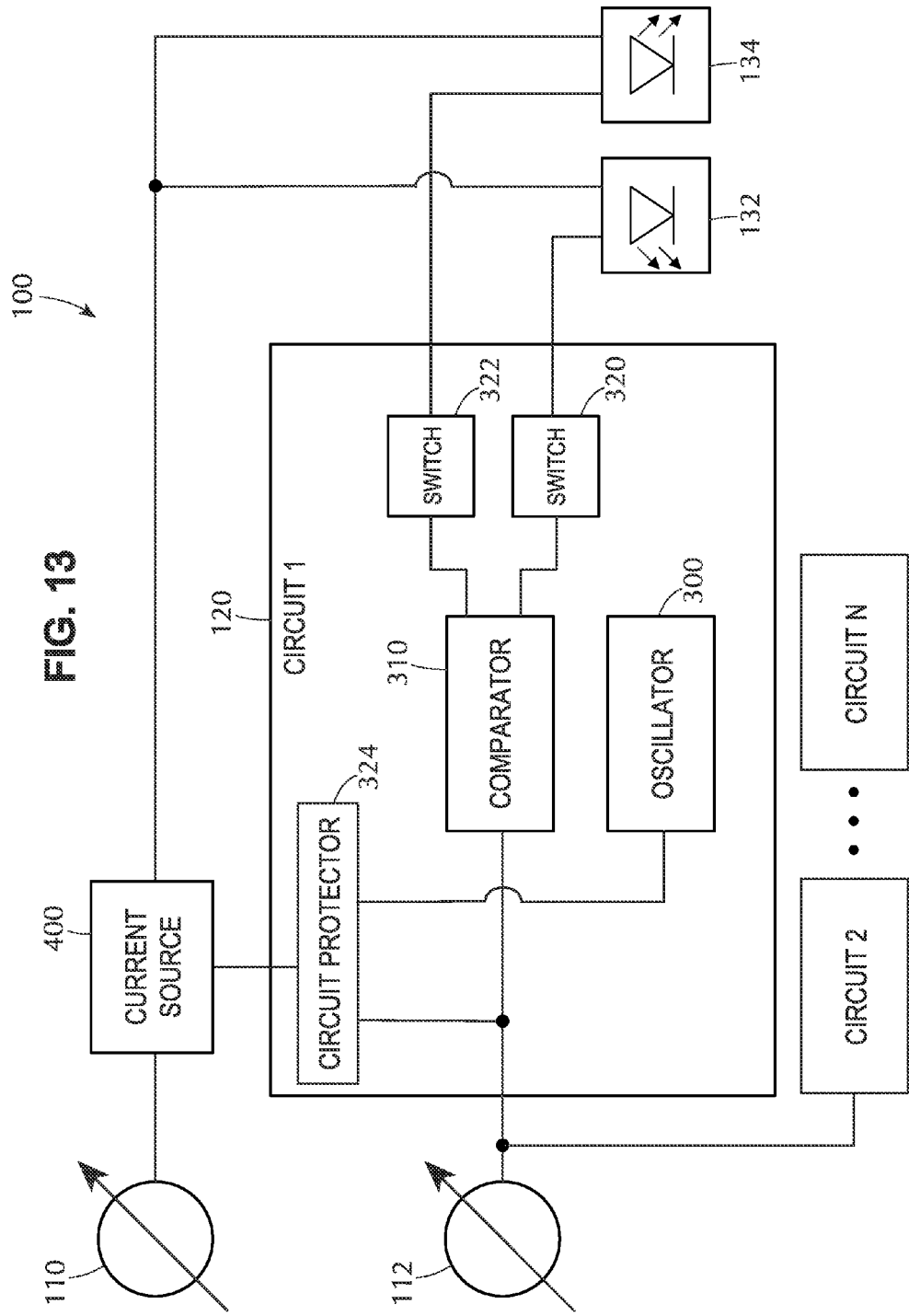

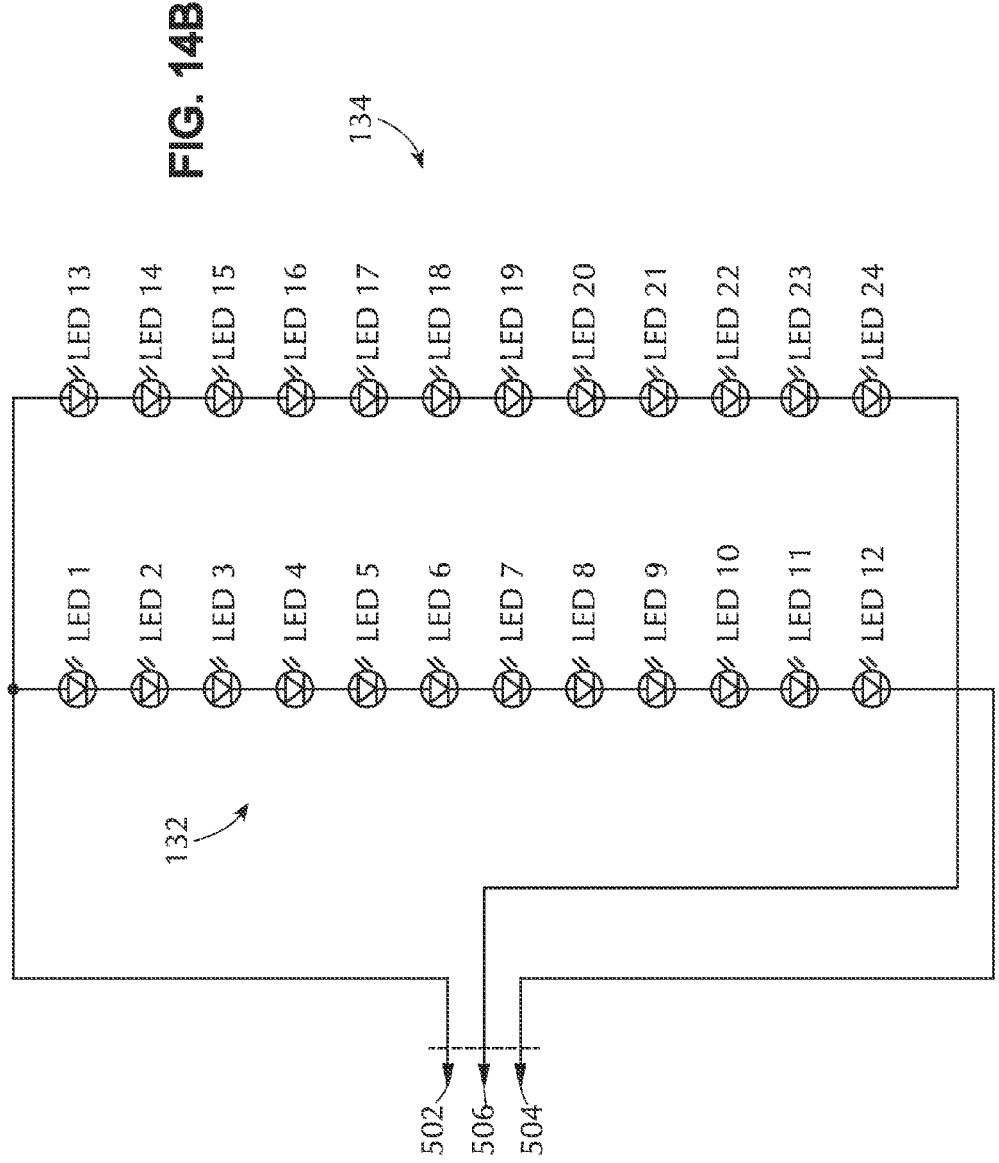

LIGHTING CONTROL SYSTEM AND METHOD

CROSS REFERENCE TO RELATED APPLICATIONS

This application is a continuation of application Ser. No. 13/902,548, filed on May 24, 2013, entitled "Lighting Control System and Method", now pending, which is a continuation of application Ser. No. 13/841,438, filed on Mar. 15, 2013, entitled "Lighting Control System and Method", now abandoned, which is a continuation-in-part of application Ser. No. 13/712,371, filed on Dec. 12, 2012, entitled "Lighting System Having a Dimming Color Simulating an Incandescent Light", now U.S. Pat. No. 8,456,109, which is a continuation-in-part of application Ser. No. 13/605,431, filed on Sep. 6, 2012, entitled "Lighting System Having a Dimming Color Simulating an Incandescent Light", now U.S. Pat. No. 8,581,520, which claims the benefit of U.S. Provisional Application Ser. No. 61/646,652 filed on May 14, 2012, entitled "LED Light Having a Dimming Color Simulating an Incandescent Light", and U.S. Provisional Application Ser. No. 61/656,153 filed on Jun. 6, 2012, entitled "Zero Percent Dimming LED Light Engine". The contents of those applications are incorporated herein by reference.

FIELD OF THE INVENTION

The apparatus described herein generally relates to the field of interior lighting; and, more directly, to the field of LED interior lighting.

BACKGROUND OF THE INVENTION

Light Emitting Diodes (LEDs) are desirable for use in lighting fixtures due to the efficiency and reliability of LEDs. LEDs used for interior lighting are typically high output devices that emit light that is a "pure" white (or nearly white) color. This color and output level work well for situations where bright lighting is desired. Some modern LED interior lights have a dimming feature for when lower light levels are desired. However, prior LED dimming systems do not closely follow the dimming color curve of an incandescent light, particularly at low and very low dimming levels. Also, the color of an LED does not change appreciably when the LED is dimmed, as does an incandescent light.

Unlike LEDs, traditional incandescent bulbs change color as they dim. Normally, the filament in an incandescent bulb emits a light with a color temperature of about 3000 Kelvin (K) at full brightness, which is considered a relatively "cool" white color. As the incandescent light is dimmed and the current is decreased, the filament emits a light that shifts away from "cool" white toward a "warm" color, such as red/amber color output (e.g., a lower color temperature).

The color or appearance of a light source can be defined as a color temperature and is measured in degrees Kelvin (K). For example, a fluorescent light may have a very "cold" color temperature of 4000K (which may appear bluish), whereas a standard incandescent light bulb may have a "cool" color temperature of about 3000K (appears pure white) at full brightness. Further, a standard bulb may have a "warm" color temperature of 2000K (appears amber/red) when dimmed to 5-10% of full brightness. The color temperature change of an incandescent light bulb generally follows the color change of a cooling black body (i.e., the Black Body Locus). People sometimes prefer this "warming" effect and dislike the non-color shifting dimming of LED lights.

In certain applications, it may be advantageous to independently control the color and the brightness. For example, it may be desired to have a relatively high brightness level for the LEDs, but have a perceived "warmer" color to the light emitted by the LEDs.

When the color temperature is adjusted, for example using a dimmer, the change in color can appear to the human eye to change or jump very quickly when a significant adjustment is made to the dimmer. This is undesirable. When adjusting the perceived color of the light emitted by the LEDs, it is preferred to "soften" or slow the rate of change in color temperature to allow the human eye to receive a gradual color change.

Finally, another problem with current systems is that when an LED light fixture in a group of fixtures fails this can have a significant negative effect on the control circuitry controlling the fixtures, even potentially damaging the other fixtures.

Therefore, what is desired is a lighting system suitable for LED lights which closely mimics the color curve and intensity curve of an incandescent light when dimming.

An object of the invention is to provide an LED lighting fixture that closely follows the dimming intensity of an incandescent light when dimming.

Another object of the invention is to provide an LED lighting fixture which mimics the warming color change of an incandescent bulb when the lighting fixture is dimmed.

Another object of the invention is to provide an LED lighting fixture with the above features and which provides a precise, "cool" light color that approaches a "white" light source when at full brightness.

Another object of the invention is to provide an LED lighting fixture having the above features and having the ability to dim in a smooth, gradual manner, without perceptible discrete steps or jumps in the level of light during dimming.

Another object of the invention is to provide an LED lighting fixture having the above features and having the ability to dim in a smooth, gradual manner, without perceptible, discrete steps or jumps in the perceived color of light during dimming.

Another object of the invention is to provide an LED lighting fixture having the above features which is operable with standard drivers for LED lighting fixtures.

Still another object of the invention is to provide an LED lighting system that provides for LED dimming along with perceived LED color shifting that mimics a standard incandescent lamp that is dimmable for substantially the entire range of a commercially available dimmer switch.

Yet another object of the invention is to provide an LED lighting system that provides for independent control of the intensity (brightness) of an LED light fixture and the perceived color of the light fixture, i.e., color temperature.

It is also desired to provide an LED lighting system that slows the rate of color change when the controller is adjusted to change the perceived color of light emitted by an LED light fixture.

It is also desired to provide an LED lighting system with the above features which can be controlled with standard controls, such as standard wall-mounted dimmer controls.

Finally, it is desired to provide an LED lighting system that protects the control circuit for adjusting the color and brightness of other LED light fixtures on the same dimmer when one or more individual fixtures fail.

SUMMARY OF THE INVENTION

In an embodiment, the lighting system includes a lighting fixture having a white light source and a color light source (e.g., cool white and warm white), a controller generating a control signal corresponding to a selected brightness level of the lighting fixture, a control circuit controlling the white and color light sources in response to the control signal. The control circuit pulses the white light source and the color light source when the light fixture is within a range of brightness levels, and in response to a change in the control signal, the control circuit changes the relative duty cycles of the white and color light sources, to alter a perceived color output of the lighting fixture, as the brightness level of the lighting fixture is changed by the controller.

Pulse Width Modulation (PWM) is a modulation technique that generates variable-width pulses to represent the amplitude of an analog input signal, akin to fixed-width pulse density modulation (PDM). PWM is used in LED's as a brightness control by switching fully on and off a fixed constant current and varying the ratio of on to off time. The current through the LED stays constant and ratio of time on vs. time off may be changed to control the LED's effective brightness. Alternatively, with an analog control approach, to control the brightness of an LED(s), the current going through the LED(s) is changed in a linear or gradual manner between two levels, for example full off to full on. Time Division Multiplexing (TDM) is a technique whereby two or more individual signals are merged into a combined signal by inserting pieces of the individual signals into alternating time slots of the combined signal. The approach taken with the present invention is a method utilizing a hybrid mixture of a modulated form of TDM, together with analog modulation which differs from standard TDM, PWM and analog modulation.

In one embodiment, the system includes a light dimmer and standard LED dimmable driver that functions to dim the LED(s) based on the users setting on the dimmer. Accordingly, the system functions by changing the value of the constant current provided to the driver based on a users setting of the dimmer. Typical values are from 100% fully on, down to 1% fully off in the dimmers commonly used. This provides the LED(s) with a changing current based on user selection which in turn dims the LED(s) with analog type modulation of the constant current source. The changing current is converted into a TDM modulation pattern for driving the LED(s) with a hybrid combination of analog modulation, and mix of analog/TDM modulation.

In another embodiment, the lighting system also has a switch that is in series with the white light source or the color light source, a signal generator producing a periodic signal, a comparator receiving the periodic signal from the signal generator and controlling the switch. The comparator compares a reference voltage to a signal voltage, where the reference voltage relates (e.g., is proportional) to an aggregate (i.e., combined) current driving the white and color light sources, and the signal voltage relates to the periodic signal. The switch is in either an open or closed state when the reference voltage exceeds the signal voltage and is in the other state (i.e., closed or open) when the signal voltage exceeds the reference voltage.

In an incandescent lamp that is dimmed, a color shift does not often occur immediately as the incandescent lamp is dimmed. Rather, the color shift begins to occur at a point on the dimming curve after maximum brightness. Accordingly, the LED dimming system is provided such that the perceived color shifting provided by the system does not begin until the light is dimmed to a point below a predetermined point on the dimming curve so as to imitate an incandescent lamp that is dimmed. Likewise, on the lower end of the dimming curve it is contemplated that the perceived color shift will be completed prior to the LEDs being completely dimmed to zero.

The signal voltage varies between minimum and maximum values, and the maximum value exceeds the reference voltage when the brightness level of the lighting fixture is below a predetermined brightness level (where perceived color change begins to occur as discussed above). When the brightness level of the lighting fixture is above the predetermined brightness level, the switch remains in the one of the open and closed states (where no perceived color change occurs). When the brightness level is below the predetermined brightness level, the switch alternates between the open and closed states (at least when the reference voltage exceeds the minimum value of the signal voltage).

The white light source and the color light source comprise LEDs and one of the light sources has a high total forward bias voltage and the other light source has a low total forward bias voltage (which is lower than the high total forward bias voltage of the one light source). The switch is connected in series with the light source having the low total forward bias voltage, and the other light source having the high total forward bias voltage is connected in parallel with the switch and the light source having the low total forward bias voltage. When the switch is in the open state, the light source having the low total forward bias voltage is off, and the other light source having the high total forward bias voltage is on, and, when the switch is in the closed state, the light source having the low total forward bias voltage is turned on, and the other light source having the high total forward bias voltage is automatically turned off.

In an embodiment, the color light source has the low total forward bias voltage and is connected in series with the switch. The switch is in the open state when the reference voltage exceeds the signal voltage, and is in the closed state when the signal voltage exceeds the reference voltage.

In an embodiment, a duty cycle of the color light source varies inversely to a duty cycle of the white light source. Optionally or additionally, the control circuit pulses the white light source and the color light source alternately, whereby when the white light source is pulsed on, the color light source is off and when the color light source is pulsed on, the white light source is off.

The lighting system further has a current source providing a current (such as a constant current driver) and the current produced by the current source drives both of the white and color light sources and the control circuit. The controller can comprise a dimmer connected to the current source.

It is further understood that it may be desired to control the intensity (brightness) of an LED light fixture independent from the perceived overall color of light emitted by the light fixture. For example, in displays or in specialized lighting applications, a user may desire to have a "warmer" feel to the light with a relatively high intensity. Alternatively, a user may desire to have a "cooler" feel to the light with a relatively low intensity. In order to provide for independent control of intensity and color, the system is provided with two control signals that are simultaneously input into the lighting control system. A first control signal is provided to control LED intensity and comprises a current source for driving both the white and the color light sources. The first control signal may be provided, for example, by a first wall-mounted slide-type dimmer switch where adjustment of the dimmer results in a change in the current supplied to the white and color light sources thereby adjusting brightness.

A second control signal is provided to the control circuit that is used to control the relative on-off times of the white and color light sources. The second control signal may be provided, for example, by a second wall-mounted slide-type dimmer switch where adjustment of the dimmer results in a change in the voltage supplied to the control circuit thereby causing a change in the perceived color emitted by the light fixture.

A method of controlling a lighting system includes the steps of: providing a lighting fixture having a white light source and a color light source, generating a control signal corresponding to a selected brightness level of the lighting fixture, and pulsing the white light source and the color light source when the light fixture is within a range of brightness levels. In response to a change in the control signal, changing relative duty cycles of the white and color light sources, to alter a color output of the lighting fixture, as the brightness level of the lighting fixture is changed by the controller.

The method also includes providing a switch in series with one of the white light source and the color light source, generating a periodic signal, a comparator receiving the periodic signal and controlling the switch. The comparator compares a reference voltage to a signal voltage, where the reference voltage relates to (e.g., is proportional to) an aggregate (i.e., combined) current driving the white and color light sources, and the signal voltage relates to the periodic signal. The switch is in an open state or a closed state when the reference voltage exceeds the signal voltage and is in the other state (closed or open) when the signal voltage exceeds the reference voltage.

The signal voltage is varied between a maximum value and a minimum value, where the maximum value of the signal voltage exceeds the reference voltage (at least when the brightness level of the lighting fixture is below a predetermined high brightness level). When the brightness level of the lighting fixture is above the predetermined high brightness level, holding the switch in the one of the open and closed states, and when the brightness level is below the predetermined brightness level, alternating the switch between the open and closed states when the reference voltage exceeds the minimum value of the signal voltage. Further when the lighting fixture is below a predetermined low brightness level, holding the switch in the other of the open and closed states.

The duty cycle of the color light source varies inversely to a duty cycle of the white light source, and the white light source and the color light source are alternately pulsed, whereby when the white light source is pulsed on, the color light source is off and when the color light source is pulsed on, the color light source is off.

A current is provided to drive the white and color light sources and the control circuit includes a dimmer which is connected to the current source.

In another aspect of the invention, a delay is introduced to the system when a user makes an adjustment to the perceived color light emitted by the LED light fixture. For example, in the embodiment having two independent control signals for the brightness and color, a low pass filter is provided on an input to the controller to alter the rate of change of the color control signal, such that, an immediate change in the dimmer setting is not translated into an immediate change in color temperature. Rather, the color temperature will slowly or gradually change to the new setting based on the filter arrangement. In other words, even if a user quickly adjusts the dimmer switch controlling the perceived color output by the LED light fixture, this quick dimmer adjustment will not be translated into an equally quick color adjustment of the light emitted by the LED light fixture. Rather, the perceived color shift will occur gradually as dictated by the low pass filter.

In one embodiment a method of operating an LED light fixture, is provided comprising the step of supplying a current to a light source, the light source having first and second groups of light-emitting diodes (LEDs) and each group having at least one LED, where a controller receives a timing signal having a period. The method further comprises the step of supplying a color control signal to the controller, the color control signal having a first electrical characteristic, where in response to the color control signal, the controller alternately pulsing the first and second groups of LEDs during the period, such that the first group of LEDs has a first duty cycle and the second group of LEDs has a second duty cycle during the period. The method still further comprises the step of modifying the color control signal such that the color control signal has a second electrical characteristic that is different than the first electrical characteristic, where in response to the modified color control signal, the controller alternately pulsing the first and second groups of LEDs during the period, such that the first group of LEDs has a third duty cycle different than the first duty cycle and the second group of LEDs has a fourth duty cycle different than the second duty cycle during the period. The method is provided such that a change in the duty cycle of the first group of LEDs from the first duty cycle to the third duty cycle being inverse (i.e., opposite) to a change in the duty cycle of the second group of LEDs from the second duty cycle to the fourth duty cycle.

In another embodiment a Light-Emitting Diode (LED) light is provided, comprising, a first group of LEDs, a second group of LEDs and a current source for providing an electrical current to the first and second groups of LEDs. The LED light further comprises, a first dimmer generating a first control signal for setting a brightness level of the first and second groups of LEDs, an oscillator generating a timing signal having a period, and a controller receiving the timing signal and coupled to the first and second groups of LEDs. The LED light still further comprises, a second dimmer generating a second control signal for setting a color setting of the first and second groups of LEDs, the second dimmer coupled to the controller and the controller receives the second control signal. The LED light is provided such that in response to the second control signal, the controller alternately pulses the first and second groups of LEDs during the period, such that the first group of LEDs has a first duty cycle and the second group of LEDs has a second duty cycle during the period.

In still another embodiment a method of operating an LED light fixture, is provided comprising supplying a current to a light source, the light source having first and second groups of light-emitting diodes (LEDs) and each group having at least one LED, generating a timing signal having a period, and generating a first control signal. A controller is provided for receiving the first control signal. In response to the first control signal, the controller alternately pulsing the first and second groups of LEDs during the period, such that the first group of LEDs has a first duty cycle and the second group of LEDs has a second duty cycle during the period. The method further comprises generating a second control signal different than said first control signal and the controller receives the second control signal. In response to the second control signal, the controller alternately pulsing the first and second groups of LEDs during the period, such that the first group of LEDs has a third duty cycle different than the first duty cycle and the second group of LEDs has a fourth duty cycle different than the second duty cycle during the period. A change in the duty cycle of the first group of LEDs from the first duty cycle to the third duty cycle is inverse to a change in the duty cycle of the second group of LEDs from the second duty cycle to the fourth duty cycle.

In another embodiment a method of operating an Light-Emitting Diode (LED) light fixture having a light source that includes a first LED and a second LED coupled to a controller is provided, the method comprising the steps of supplying a current to the light source, supplying a first control signal to the controller, and alternately pulsing the first LED and the second LED during a period, such that the first LED has a first duty cycle and the second LED has a second duty cycle during the period. The method further comprises the steps of supplying a second control signal to the controller, where the second control signal is different than said first control signal, and alternately pulsing the first LED and the second LED during the period, such that the first LED has a third duty cycle different than the first duty cycle and the second LED has a fourth duty cycle different than the second duty cycle during the period. The method is provided such that the difference in the duty cycle of the first LED from the first duty cycle to the third duty cycle is inverse to a change in the duty cycle of the second LED from the second duty cycle to the fourth duty cycle.

BRIEF DESCRIPTION OF THE DRAWINGS

FIG. 13 is block diagram of a lighting system according to the embodiment shown in FIG. 1.
FIGS. 14A & 14B is a schematic of a lighting system according to the embodiment shown in FIG. 1.

DETAILED DESCRIPTION OF THE INVENTION

Disclosed herein is a lighting system which employs color light-emitting diodes (LEDs), along with white LEDs (e.g., "warm" LEDs and "cool" LEDs) to mimic the color change of an incandescent bulb when dimming. This lighting system is primarily useful for LED lighting applications and is specifically designed to overcome the drawbacks of LED lighting for dimming lighting applications. In particular, the lighting system is suitable for dimmable lighting systems, such as recessed lighting fixtures, solely employing LED lights.

Figure 1:
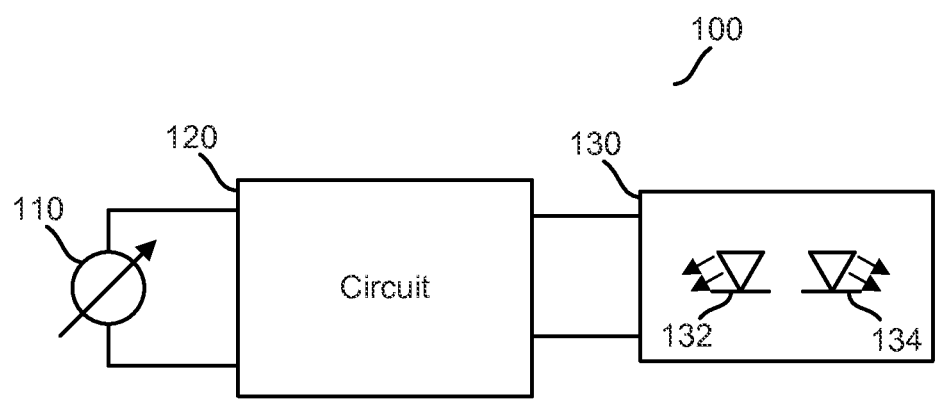
FIG. 1 is a block diagram of a lighting system according to one embodiment.

As shown in FIG. 1, lighting system 100 includes dimmer 110, circuit 120, and light source 130. A user lowers the brightness level setting on dimmer 110, which is detected by circuit 120. Circuit 120, in response, lowers the light output of light source 130 while simultaneously changing its perceived color. Preferably this color change increases the "warmth" of the light as light source 130 is dimmed, to mimic an incandescent bulb or black body light temperature curve. As a user raises the brightness setting on dimmer 110, circuit 120 increases the brightness of light source 130 and changes its color toward "white", as dimmer 110 approaches maximum brightness settings. At a maximum brightness setting, light source 130 preferably outputs a "white" light. The white light source may comprise an array of white LEDs that are precision "binned" (i.e., selected) so as to provide nearly pure white light when in the fully on position.

For purposes of this application, the term "white" light source refers to a light source which emits light having relatively equal amounts of color (e.g., sunlight being one example), such that the color of the light appears "white" to the human eye.

Lighting system 100 has a white light source 132 and a color light source 134 within light source 130. Preferably, the white light source includes LEDs producing light at or above 2800K or 2700K and the color light source includes LEDs producing light at or below 2200K. When lighting system 100 is fully on (i.e., not dimmed), preferably only white light source 132 is on and color light source 134 is off. When lighting system 100 is dimmed to a predetermined brightness level, white light source 132 and color light source 134 are pulsed (e.g., white light source 132 is rapidly turned off for a brief time and color light source 134 is turned on for that time, and vice versa) so as to alter the aggregate (perceived) light emitted by the lighting system. The lighting system pulses the white and color light sources at a very high rate (e.g., at least 200-300 cycles per second (Hz)), which is imperceptible to the human eye. As lighting system 100 is dimmed further, the relative duty cycles of white light source 132 and color light source 134 are altered (i.e., color light source 134 is turn on for a larger and larger percentage of the time as compared to white light source 132) to increase the "warmth" of the perceived light.

Figure 2:
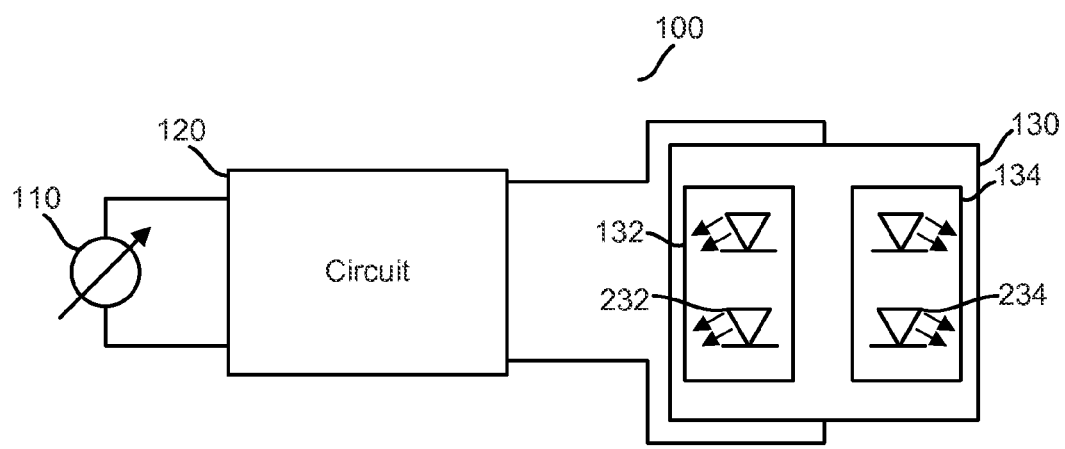
FIG. 2 is a block diagram of a lighting system according to the embodiment shown in FIG. 1.

FIG. 2 shows that light source 130 may comprise multiple arrays of LEDs. For example white light source 132 may be one array (e.g., series) of LEDs while color light source 134 is another array of LEDs in parallel with white light source 132. For example, white light source 132 could comprise an array of white LEDs 232, and color light source 134 could comprise an array of color LEDs 234.

Figure 3:
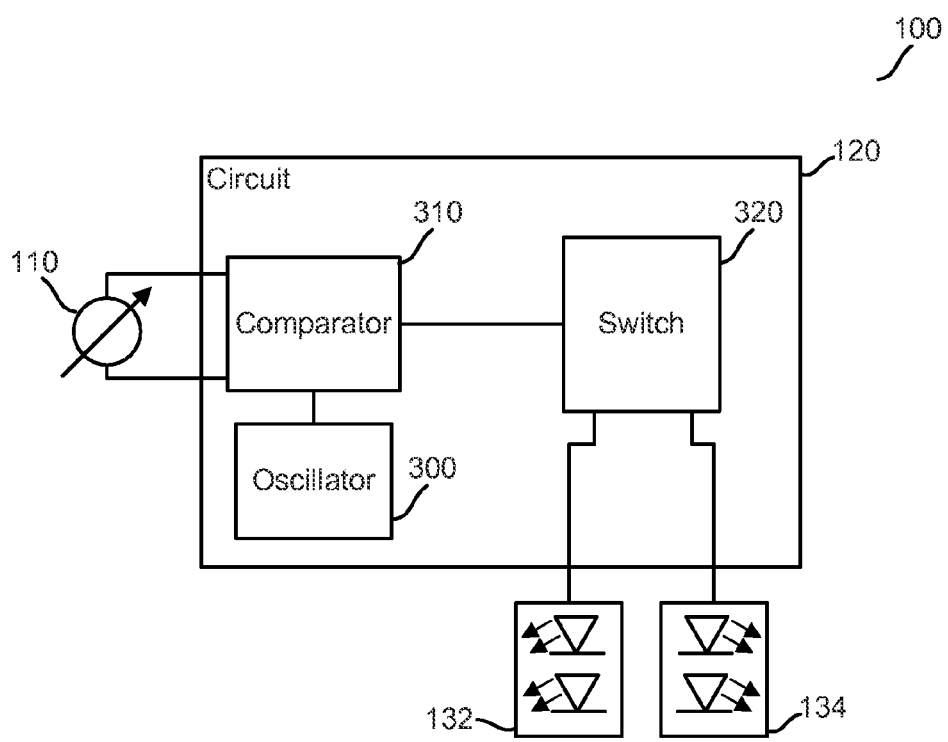
FIG. 3 is a block diagram of a lighting system according to the embodiment shown in FIG. 1.

FIG. 3 shows several components of one embodiment of circuit 120 in lighting system 100. Circuit 120 comprises comparator 310, oscillator 300, and switch 320. Oscillator 300 produces a periodic signal such as a saw-tooth wave, such as a triangle-shaped wave. In one embodiment, oscillator 300 is a relaxation oscillator. Comparator 310 compares a reference voltage to the voltage of the periodic signal generated by oscillator 300. When the signal voltage exceeds the reference voltage, comparator 310 instructs switch 320 to turn on color light source 134 and shut off white light source 132.

The reference voltage will increase and decrease in proportion to the current supplied to lighting system 100. This will result in color light source 134 being on and white light source being off for a longer duty cycle of each period of the periodic signal as the current is decreased. The duration of the duty cycle of color light source 134 varies inversely to the current supplied to lighting system 100. In other words, the portion of the periodic signal during which color light source 134 is on increases as current is decreased because the reference voltage decreases proportional to the current.

Turning on color light source 134 automatically switches off white light source 132. Therefore, white light source 132 will be on for a portion of the periodic signal that is below the reference voltage. This portion of the periodic signal during which white light source 132 is on decreases as current is decreased because the reference voltage is proportional to the current. The current supplied to lighting system 100 is generally controlled by a user input via dimmer 110. Thus, as dimmer 110 is operated to dim the lights, more color light is emitted by lighting system 100 in proportion to the white light emitted.

Figure 4:
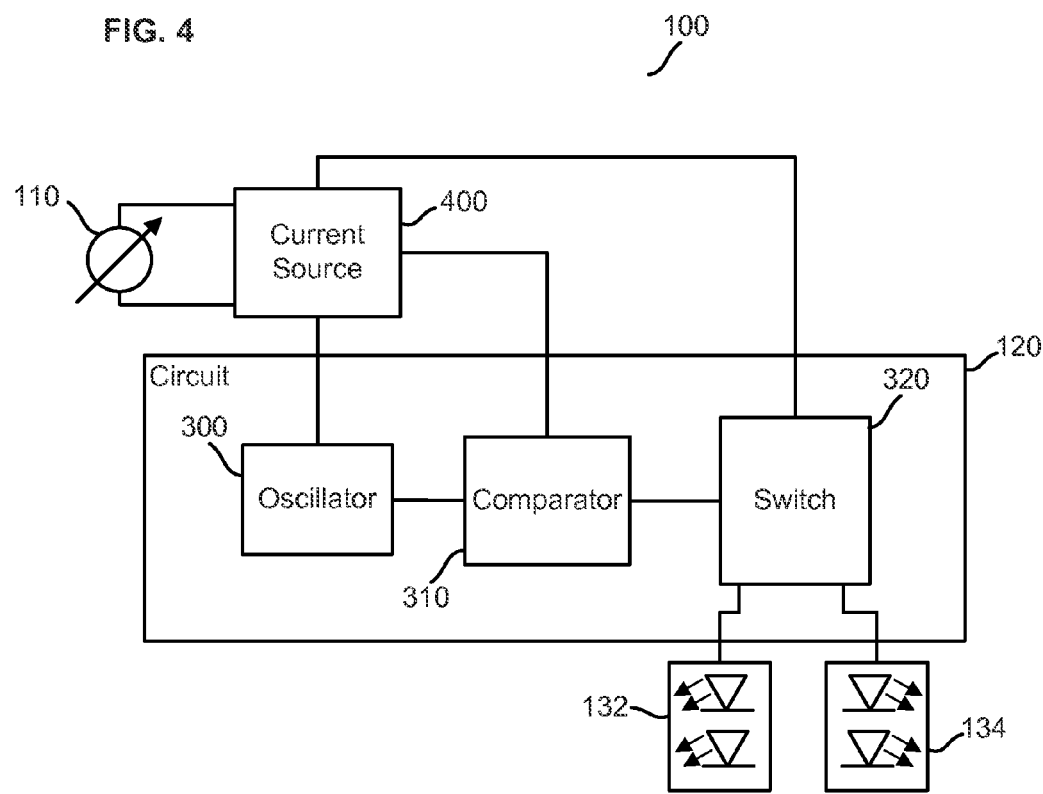
FIG. 4 is a block diagram of a lighting system according to the embodiment shown in FIG. 1.

FIG. 4 shows a more detailed diagram of an embodiment of lighting system 100. Lighting system 100 now includes current source 400, which is controlled by dimmer 110. Current source 400 is a constant current supply wherein the current level can be varied by dimmer 110, but the current will be constant at a given setting regardless of the load applied. The reference voltage used by comparator 310 is determined by the current source 400 output to lighting system 100. Current source 400 also supplies power to oscillator 300. Switch 320 diverts current from current source 400 to selectively and/or alternately power white light source 132 and color light source 134.

Figure 5:
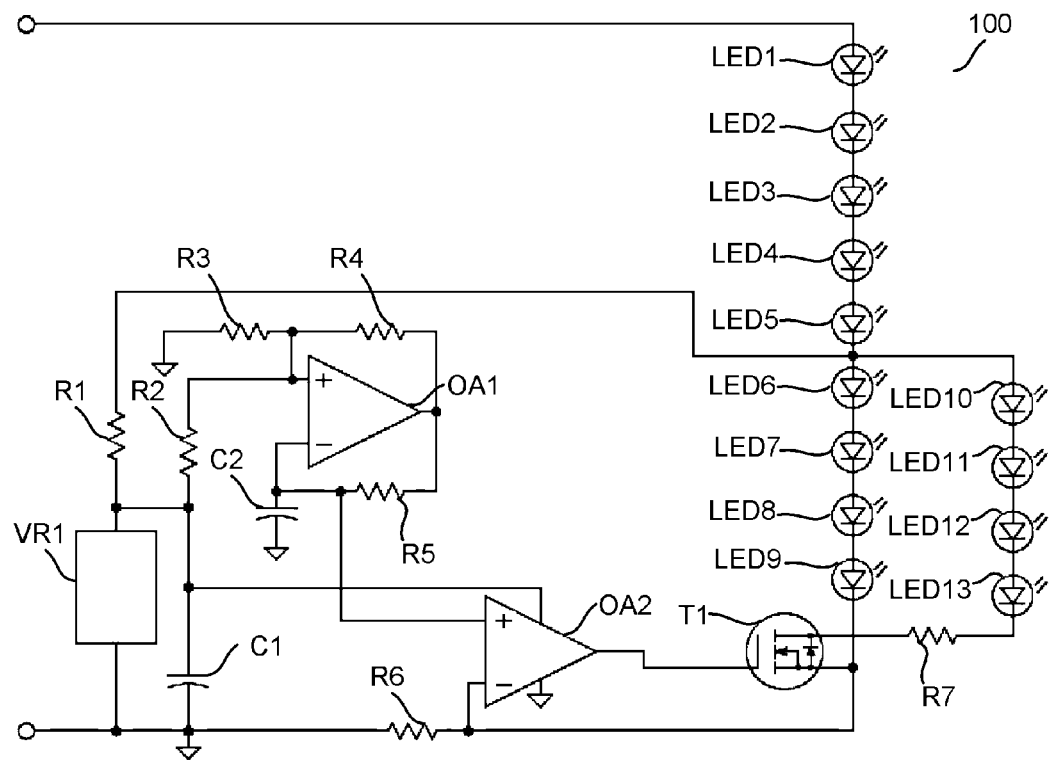
FIG. 5 is a schematic of a lighting system according to the embodiment shown in FIG. 1.

FIG. 5 shows a schematic of one embodiment of lighting system 100. The following table provides the component values for the embodiment shown in FIG. 5.

TABLE 1

Component values for circuit shown in FIG. 5.

| LABEL | COMPONENT |
|---|---|
| VR1 | ZRC500 |
| R1 | 4.75K |
| R2 | 221K |
| R3 | 15K |
| R4 | 100K |
| R5 | 100K |
| R6 | 1.0 |
| R7 | 1.0 |
| OA1 | LMV342 |
| OA2 | LMV342 |
| C1 | 1 µF |
| C2 | 0.1 µF |
| LED1-LED9 | White LED |
| LED10 | Amber LED |
| LED11 | Amber LED |
| LED12 | Red LED |
| LED 13 | Deep Red LED |
| T1 | FET |

In FIG. 5, OA1 is an op amp for oscillator 300, which in this embodiment is a relaxation oscillator. The relaxation oscillator produces a saw-tooth wave, for example at 200-300 Hz. A second op-amp circuit (including op-amp OA2) below the relaxation oscillator operates as a non-inverting amplifier (i.e. comparator 310) that switches the transistor T1 (acting as switch 320) operating LED10-LED13 "on" when the voltage of the saw-tooth signal is higher than a reference voltage at current sense resistor R6. As the LED brightness and current is decreased, the reference voltage for the non-inverting amplifier OA2 decreases. At a predetermined point, the reference voltage drops below the voltage of the saw-tooth signal produced by the relaxation oscillator OA1, thereby activating LED10-LED13. Activating LED10-LED13 will deactivate LED6-LED9, because the aggregate forward voltage drop for LED10-LED13 is lower than that of LED6-LED9, thereby diverting all of the current to LED10-LED13. The result is that as the light fixture is dimmed and less current is run through lighting system 100, LED10-LED13 will spend more of the period of the saw-tooth wave on and LED6-LED9 will spend more of the period of the wave off. Preferably LED10-LED13 will be color light source 134 and LED6-LED9 will be white light source 132. LED1-LED5 are an auxiliary white light source that remains on at all times.

As shown in FIG. 5 the LED's are connected to the main fixture constant current source driver (e.g., 700 mA) at the circles at the far left side of lighting system 100. The driver is operable to supply a constant current within a range of current levels. When the dimmer is in the full bright position, all of the current goes through the first and second sets of white LED's (LED1-LED5 and LED6-LED9). This allows precision binned white LED's to be used such that lighting system 100 can provide a high quality white light when in the fully on state. Preferably, there is no perceived color change when the lighting system is in the full bright state.

The current sense resistor R6 is in series with both the white LED's and the color LED's (LED10-LED13) so that, when the lighting system 100 is dimmed, the current sense resistor R6 provides a voltage proportional to the LED's aggregate (i.e., combined) current flow on the comparator op-amp OA2, which compares the relaxation oscillator op-amp OA1's output (i.e., the signal voltage) to the reference voltage. When the main LED driver is fully on (700 mA in this example) the reference voltage will be 0.70 volts on the comparator and the maximum signal level of the relaxation oscillator is designed to be below that value thus keeping the output of the comparator a logic 0, off state for field-effect transistor (FET) T1 which will not allow any current to flow thru the color mixing LED10-LED13.

Relaxation oscillator op-amp OA1 and comparator op-amp OA2 may be part of the same package, e.g., an LMV342. The relaxation oscillator is adjustable by changing component values to set the low voltage, the high voltage, and the period of an almost saw tooth waveform output. The relaxation oscillator is set so the peak high (i.e., maximum signal voltage) is lower than the reference voltage when the dimmer is fully on. For example the minimum and maximum signal voltages can be approximately 0.01V and 0.650V, respectively.

Color light source 134 (LED10-LED13 in this embodiment) will start to come on when the main dimmer provides less than a predetermined current (e.g., less than 650 mA) to the LEDs and at that point the ratio of current going through the second set of white LEDs (LED6-LED9) and the color changing LED's (LED10-LED13) changes by the ratio that the saw tooth wave is "sliced" by comparator 310 (OA2). Thus the LED array circuit pulses the second set of white LEDs and the color LEDs on and off. As lighting system 100 is dimmed further (and the aggregate current through the LEDs is thereby reduced), the red/amber branch (color light source 134) emits light a greater percentage of the time and the second set of white LEDs (white light source 132) in the white branch emits light a lesser percentage of the time. This occurs as more and more of the oscillator curve is spent driving the red/amber branch.

The aggregate forward voltage drop of the red/amber color LEDs (LED10-LED13) is lower than the aggregate forward voltage drop of the parallel set of white LED's (i.e., the second set of white LEDs LED6-LED9), so that, when field-effect transistor (FET) T1 switches the red/amber color LED branch on, all of the current will be redirected to the red/amber color LEDs (LED10-LED13), thereby robbing the current from the second set of white LED's (LED6-LED9). This allows the perceived color change to occur only when dimming takes place and, by changing the ratio of the duty cycles of the red/amber LEDs and the white LEDs, the aggregate (perceived) color produced by the lighting system can be made to approximate the color change curve of an incandescent light bulb during dimming, along the Black Body Locus.

Preferably, the amber LEDs in the color LEDs include or consist of phosphor converted amber LEDs, such as the Philips LXM2-PL01 series, which use an Indium Gallium Nitride (InGaN) die internally and internal phosphor generates amber light. It has been found that phosphor converted amber LEDs produce a relatively broad light spectrum, as compared to the monochromatic AlInGap-type amber LEDs, which produce light in a relatively narrow spectrum. The relatively broad light spectrum produced by the InGaN-type LEDs provides a warmer lighting effect during dimming. In addition, the color produced by InGaN-type amber LEDs is more stable over different operating temperature ranges, as compared to AlInGap-type amber LEDs, which provides for more predictable and controllable mixing of colors during dimming.

Figure 6:
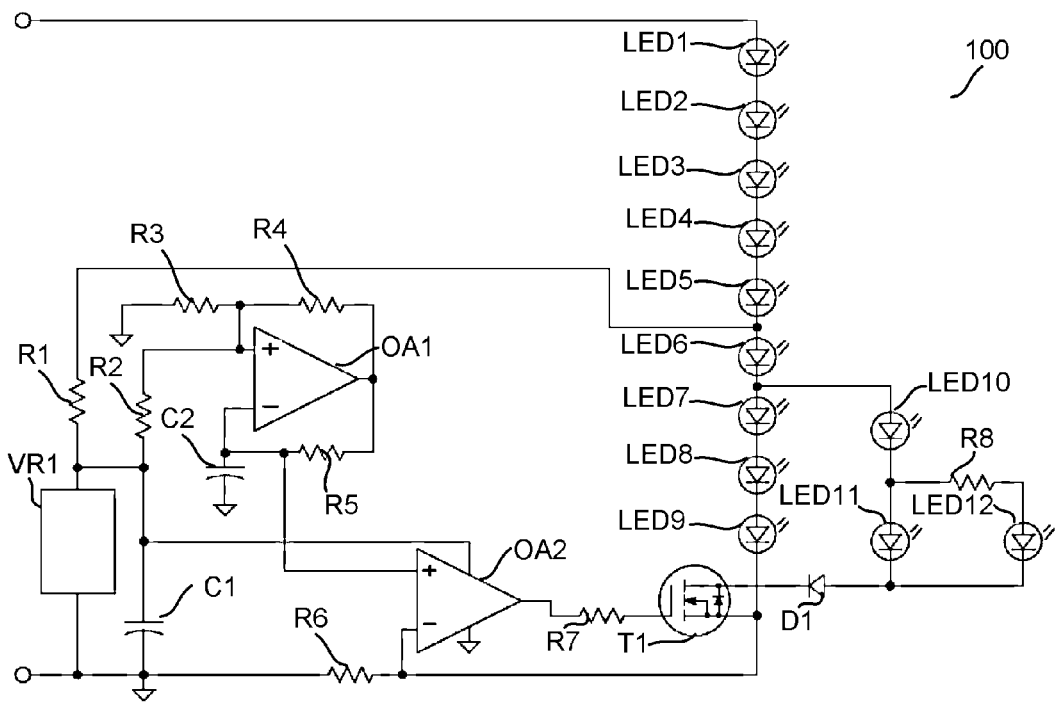
FIG. 6 is a schematic of a lighting system according to the embodiment shown in FIG. 1.

Referring to FIG. 6, the LED array circuit can have a red/amber color LED branch having a red LED12 and a resistor R8 in parallel with an amber LED11, which are in series with a second amber LED10 and a diode D1. This combination has the unique function that when the current is reduced in the amber/red branch of LED's (LED10-LED12) the red LED12 will get brighter relative to amber LED11 thus providing more red color from the color LED branch at the lower dim levels. The following table provides the component values for the embodiment shown in FIG. 6.

TABLE 2

Component values for circuit shown in FIG. 6.

| LABEL | COMPONENT |
| --- | --- |
| VR1 | ZRC500 |
| R1 | 4.75K |
| R2 | 221K |
| R3 | 10K |
| R4 | 100K |
| R5 | 100K |
| R6 | 1.0 |
| R7 | 20 |
| R8 | 49.9 |
| OA1 | LMV342 |
| OA2 | LMV342 |
| C1 | 1 µF |
| C2 | 0.01 µF |
| LED1-LED9 | White LED |
| LED10 | Amber LED |
| LED11 | Amber LED |
| LED12 | Red LED |
| T1 | FET |

The LED circuit array of FIG. 6 provides a LED light having essentially three states. In a first state, dimmer 110 is in the fully on position (no dimming). In this state, only white LED1-LED9 are powered. When the light is dimmed to a predetermined brightness level, the light fixture enters a second state, where red/amber color LED10-LED12 are cycled on to provide a perceived warmer color during dimming. From the second state, the light fixture transitions into a third state, where the red LED12 gets brighter than the parallel amber LED11 as current is reduced to a low level, to provide more red color at the lower dim levels.

In the circuit of FIG. 6, the values of resistor R8 and the relaxation oscillator can be selected so that the color change during dimming very accurately resembles the look of an incandescent light bulb when dimming. Capacitor C2 of the relaxation oscillator can be 0.01 uF so that the oscillator produces a signal with a high frequency (e.g., above 200 Hz) to avoid any perceptible flicker. Also, resistor R3 can be 10K, to set the threshold at which color mixing begins to occur to a relatively high level so that color mixing starts as soon as dimming occurs.

A change to the FIG. 6 circuit is the placement of the red/amber branch after LED6 instead of LED5. This increases the amount of white light emitted when the red/amber LED10-LED12 are on during the dimming phases. In particular, the first set of white LEDs comprises LED1-LED6, and the second set of white LEDs comprises LED7-LED9.

Figure 7:
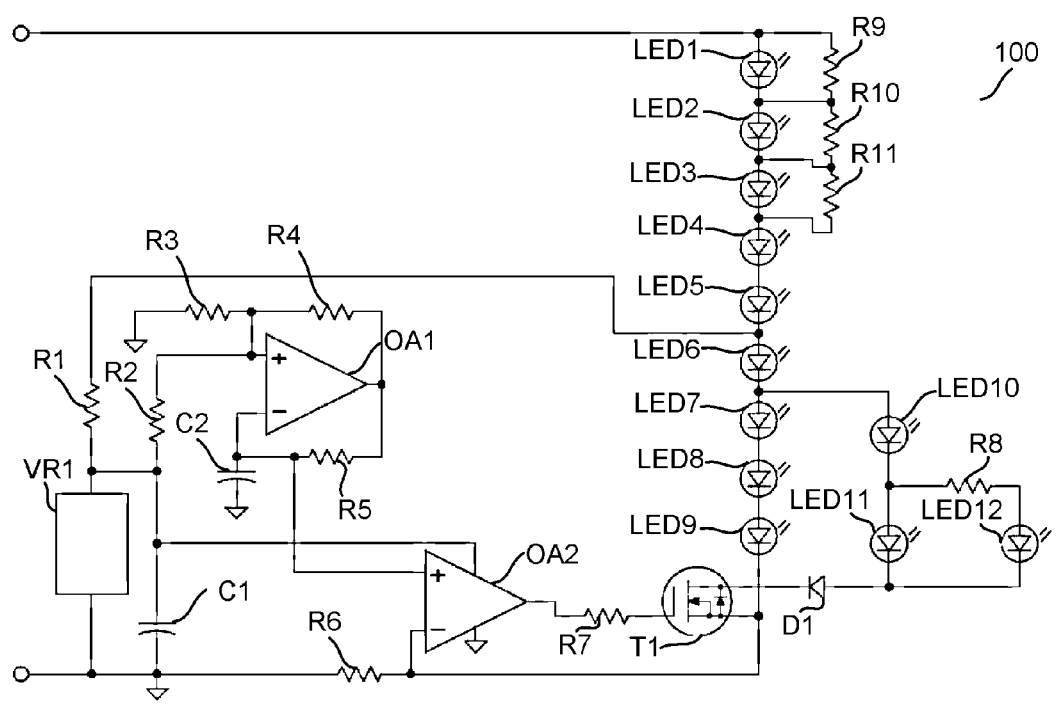
FIG. 7 is a schematic of a lighting system according to the embodiment shown in FIG. 1.

FIG. 7 shows a circuit which includes four states—the three states featured in the FIG. 6 circuit and a fourth state at very low dim (almost off). In this circuit, resistors R9-R11 are added in parallel to white LEDs LED1-LED3, respectively. As the current begins to approach the 5-10 mA range (at very low brightness settings), R9-R11 draw current away from LED1-LED3, resulting in a final dimmed state with the reddest (or warmest) color output. This would typically occur when the fixture is producing almost no useable light, but produces perceptible light and color when viewed directly or in a darkened room (for example, extremely dim lighting in a movie theater). The following table provides the component values for the embodiment shown in FIG. 7.

TABLE 3

Component values for circuit shown in FIG. 7.

| LABEL | COMPONENT |
| --- | --- |
| VR1 | ZRC500 |
| R1 | 4.75K |
| R2 | 221K |
| R3 | 10K |
| R4 | 100K |
| R5 | 100K |
| R6 | 1.0 |
| R7 | 20 |
| R8 | 49.9 |
| R9-R11 | 200 |
| OA1 | LMV342 |
| OA2 | LMV342 |
| C1 | 1 µF |
| C2 | 0.01 µF |
| LED1-LED9 | White LED |
| LED10 | Amber LED |
| LED11 | Amber LED |
| LED12 | Red LED |
| T1 | FET |

Figure 8:
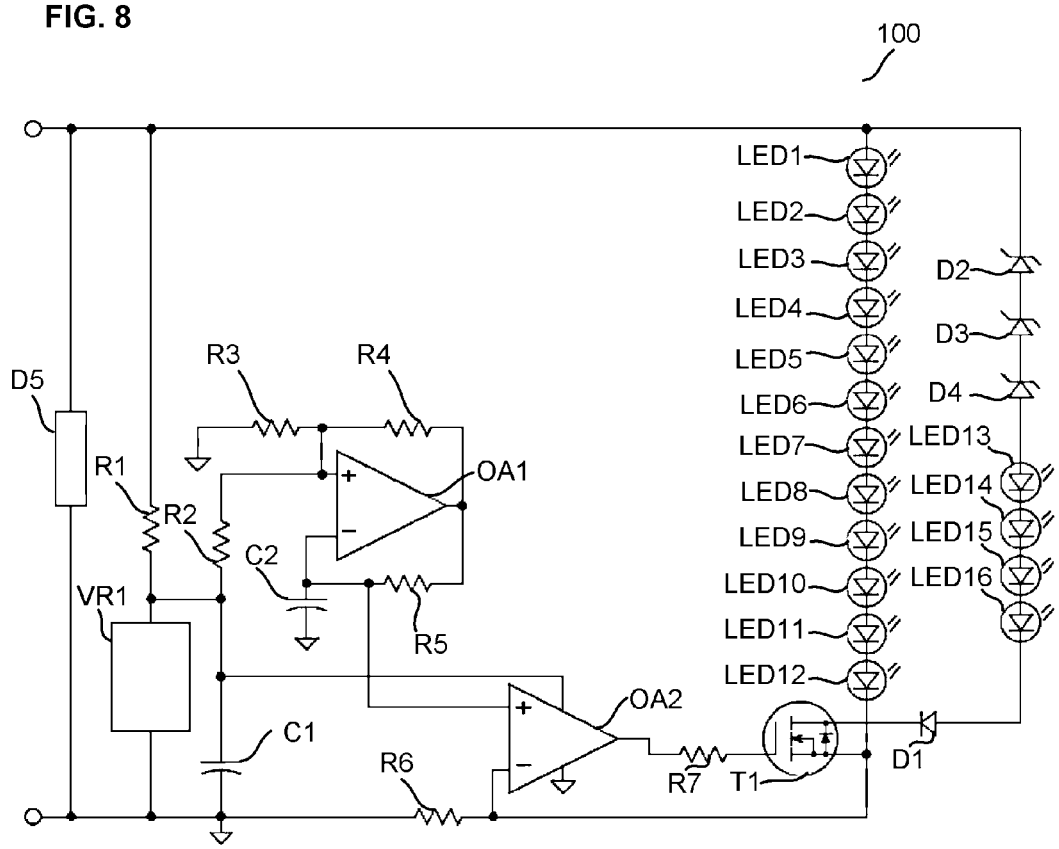
FIG. 8 is a schematic of a lighting system according to the embodiment shown in FIG. 1.

FIG. 8 shows another schematic of an embodiment of the lighting system 100. In this embodiment white light source 132 comprises LED1-LED12. Color light source comprises string of LED13-LED16, a diode D1, and three Zener diodes D2-D4. D1 prevents current from leaking from OA2 to the color LED circuit via transistor T1. In this embodiment, Zener diodes D2-D4 increase the total forward bias voltage of color light source 134 to approximate that of white light source 132. This ensures that brightness and current levels of the two light sources are closely matched. However, color light source 134 has a total forward bias voltage that is lower than that of white light source 132, so that when color light source 134 switches on, it automatically diverts all current from white light source 132. The following table provides the component values for the embodiment shown in FIG. 8.

TABLE 4

Component values for circuit shown in FIG. 8.

| LABEL | COMPONENT |
| --- | --- |
| VR1 | ZRC500 |
| R1 | 4.75K |
| R2 | 221K |

TABLE 4-continued

Component values for circuit shown in FIG. 8.

| LABEL | COMPONENT |
| --- | --- |
| R3 | 10K |
| R4 | 100K |
| R5 | 100K |
| R6 | 1.0 |
| R7 | 20 |
| D1 | Diode |
| D2-D4 | Zener Diode |
| D5 | TVS |
| OA1 | LMV342 |
| OA2 | LMV342 |
| C1 | 1 µF |
| C2 | 0.01 µF |
| LED1-LED12 | 2800K LED |
| LED10-LED13 | 2200K LED |
| T1 | FET |

In the circuits shown in FIGS. 5-8, color light source 134 should have a slightly lower bias voltage than white light source 132. This is to ensure that color light source 134 diverts all current from white light source 132 when color light source 134 is switched on.

It may be preferable to eliminate the need to ensure that the total bias voltage of one light source is less than that of the other. Doing so eliminates a significant design consideration and renders the circuit more versatile and easy to tune. Specifically, it allows a designer to pick whatever color light source 134 or white light source 132 is desired without consideration for the circuit properties of either. This allows the designer to easily tune the brightness and color curve of the lighting system to whatever specifications desired.

Figure 9:
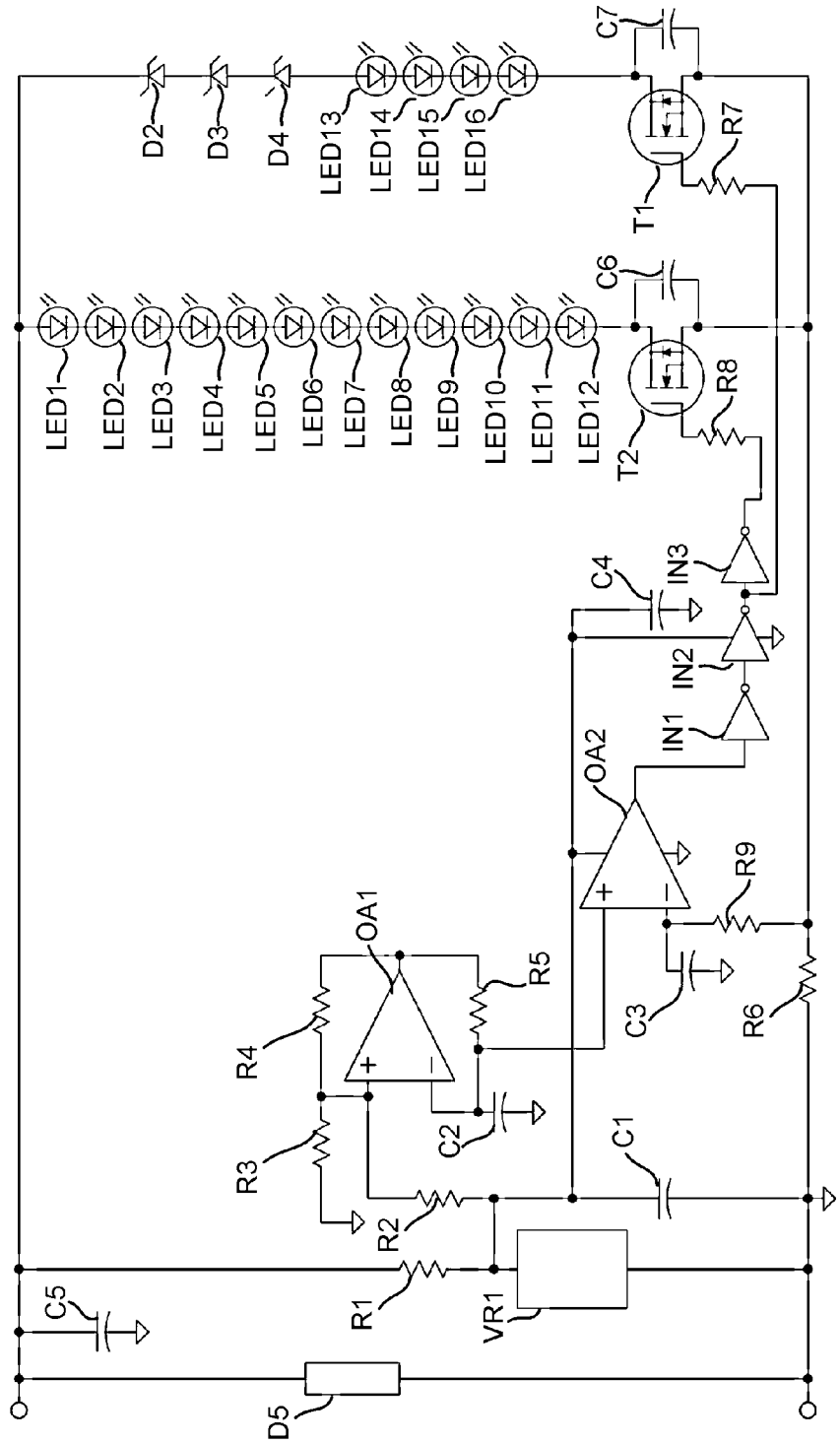
FIG. 9 is a method of controlling a lighting system employable by the embodiment shown in FIG. 1.

The circuit shown in FIG. 9 accomplishes the above objective. In this embodiment, the lighting system includes a second transistor switch T2 such that each of the white light source 132 and color light source 134 is controlled by a separate switch. Specifically, field-effect transistor T2 is connected in series with (or otherwise controls) white light source 132 (LED1-LED12), and transistor T1 is connected in series with (or otherwise controls) color light source (LED13-LED16). Both T1 and T2 are controlled by comparator OA2. Inverter buffer IN1-IN3 is a series of at least three inverters that allows only one comparator OA2 to operate both switches T1 and T2. The system is designed to operate such that T1 and T2 are on at opposite times. Therefore, IN1-IN3 are connected in series and T1 is connected to the output of IN2 and T2 is connected to the output of IN3. Since IN3 inverts the output of IN2, T1 and T2 will always have the opposite control signal and will be on at opposite times.

As shown, the color light source 134 may have substantially fewer LEDs than the white light source 132 (e.g., 4 LEDs in the color light source as compared to 12 LEDs in the white light source). Three Zener diodes D1-D3 in series with the color LEDs increase the total bias voltage of color light source 134 to approximate that of white light source 132 (the Zener diodes D1-D3 being considered to be part of color light source 134). This ensures that brightness and current levels of the two light sources are closely matched. However, color light source 134 may have a total bias voltage that is greater or lesser than that of white light source 132. For example, the circuit shown in FIG. 9 allows for color light source 134 to have a higher total bias voltage than white light source 132.

Inverters IN1-IN3 have the further advantage of buffering the comparator's output. This means that T1 and T2 will behave more like switches because the output at IN2 and IN3 will either be full voltage or ground, instead of a more gradual transition between those values as the comparator reverses its output.

In the circuit shown in FIG. 9, C3 and R9 are connected to the negative input on OA2 to create a low-pass filter which eliminates flicker at that input (and by extension the switching circuit). C6 and C7 are connected across the source and drain terminals of FETs T1 and T2 to smooth the light output of color light source 134 and white light source 132 and prevent flicker. Capacitor C4 connects to the power source of OA2 to ground and C5 connects the current source to ground to stabilize the circuit and prevent feedback and flicker.

The following table provides the component values for the embodiment shown in FIG. 9.

TABLE 5

Component values for circuit shown in FIG. 9.

| LABEL | COMPONENT |
| --- | --- |
| VR1 | ZRC500 |
| R1 | 4.75K |
| R2 | 221K |
| R3 | 10K |
| R4 | 100K |
| R5 | 100K |
| R6 | 1.0 |
| R7 | 2.25K |
| R8 | 2.25K |
| R9 | 100K |
| D1 | Diode |
| D2-D4 | 6.2 V Zener Diode |
| D5 | TVS |
| OA1 | LMV342 |
| OA2 | LMV342 |
| C1 | 1 uF |
| C2 | 0.01 uF |
| C3 | 0.1 µF |
| C4 | 0.1 µF |
| C5 | 10 µF |
| C6 | 0.1 µF |
| C7 | 0.1 µF |
| LED1-LED12 | 2800K LED |
| LED10-LED13 | 2200K LED |
| T1-T2 | FET |
| IN1-IN3 | HC04 |

Figure 10:
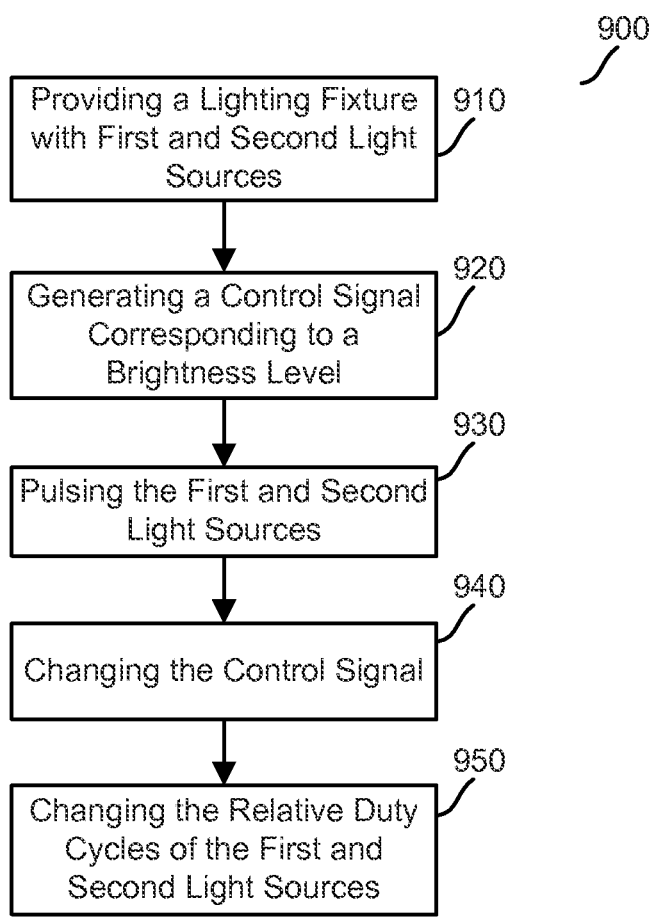
FIG. 10 is a method of controlling a lighting system employable by the embodiment shown in FIG. 1.

FIG. 10 is a diagram of a method 900 according to one embodiment. Method 900 includes the steps of providing a lighting fixture with first and second light sources 910 and generating a control signal corresponding to a brightness level 920. Method 900 further includes the steps of pulsing first and second light sources 930, changing the control signal 940, and changing the relative duty cycles of the first and second light sources 950. The first and second light sources can be white and color light sources, respectively.

A controller generates the control signal corresponding to a selected brightness level of the lighting fixture. The controller can be a dimmer and the control signal can be a current level. The first and second light sources are pulsed when the light fixture is within a range of brightness levels. The relative duty cycles of the light sources are changed, in response to a change in the control signal, to alter a perceived color output of the lighting fixture, as the brightness level of the lighting fixture is changed by the controller.

A comparator compares a reference voltage to a signal voltage, where the reference voltage relates to an aggregate current driving the first and second light sources and the signal voltage relates to a periodic signal generated by an oscillator. A switch controlled by the comparator is in series with one of the first and second light sources to pulse the light sources.

The signal voltage varies between a maximum value and a minimum value. The maximum value of the signal voltage exceeds the reference voltage when the brightness level of the lighting fixture is below a predetermined high brightness level. When the brightness level of the lighting fixture is at or above the predetermined high brightness level, the switch is held in a predetermined open or closed state. When the brightness level is below the predetermined high brightness level, the comparator alternates the switch between open and closed states, when the reference voltage exceeds the minimum value of the signal voltage. Further when the lighting fixture is at or below a predetermined low brightness level, the switch is held in the other of the open and closed states.

The first and second light sources can be alternately pulsed, whereby when the first light source is pulsed on, second light source is off and when second light source is pulsed on, first light source is off. The duty cycles of the first and second light sources can vary inversely.

Preferably, the light fixture has optical elements, such as a light mixing chamber, to blend the different colors of light from the LEDs. Preferably, the LEDs of the lighting fixture are grouped together in an LED cluster which is surrounded by a cone-shaped white reflector that is covered by a diffuser lens to properly direct, collimate and mix the light emanating from the individual LEDs to provide a blended color light output. The reflector is preferably comprised of 98% reflective material and the diffuser lens can be comprised of a plastic diffuser lens or another suitable type of diffuser.

The end result is an LED lighting system that mimics the color change exhibited by incandescent light when dimmed, closely following the BBL curve. In other words, the spectral output (or color temperature) of the light at each brightness level resembles the appropriate spectral curve for black matter at that thermal temperature (as in an incandescent bulb). Therefore, the spectral output or color temperature of the lighting system described herein is either directly on the BBL curve or substantially on it. It is desired that the light output be within the two-step McAdams ellipse, whereby the output is imperceptibly different from incandescent or BBL output. Furthermore, if all lights manufactured with this technology fit within the two-step McAdams ellipse, there will be no perceptible color differences between multiple LED lights, even as they are concurrently dimmed.

Testing of the color temperature and chromaticity of the lighting system disclosed herein has shown that the lighting system is on or substantially on the BBL curve. For example, a lighting fixture constructed according the light system disclosed herein has been found to exhibit the color temperature (Tc) and chromaticity coordinate values (CCx, CCy) set forth in Table 5 below at various dimmer settings ranging from 100% (fully on) to 10% (90% dimmed).

TABLE 6

Color Characteristics of the Lighting

| Current Level | CCx | CCy | Temperature |
|---|---|---|---|
| 100% (Full on) | 0.4432 | 0.4064 | 2916 K |
| 75% | 0.4494 | 0.4080 | 2832 K |
| 50% | 0.4579 | 0.4097 | 2721 K |
| 10% (90% dimmed) | 0.4707 | 0.4105 | 2556 K |

This system has the advantage of having integral control within the light engine because the circuitry can be contained within light engine printed circuit board (PCB) housing the LEDs, without the need for external control such as a remote control board. However, as can be appreciated, the control circuitry could be located remote from the LED light engine, if desired (for example in the driver circuitry or components). This system has further advantages because it is capable of being driven by a conventional (and previously-installed) LED lighting current source and can be controlled by conventional dimmers. It is relatively simple, elegant, and easily tunable. The lighting system is completely analog, therefore the warming of the color temperature as the light is dimmed is perfectly smooth and is without any discrete steps of jumps perceptible to human observers.

As disclosed above, the control signal corresponding to a selected brightness of the lighting fixture can be a current signal (i.e., a current level) regulated by a suitable control device, such as a dimmer. However, the control signal can be another electrical characteristic produced or regulated by a different type of electronic component or device. For example, the control signal could be signal based on voltage, resistance, or inductance, or another suitable electronic characteristic, produced or regulated by a suitable electronic component or device.

Figure 11:
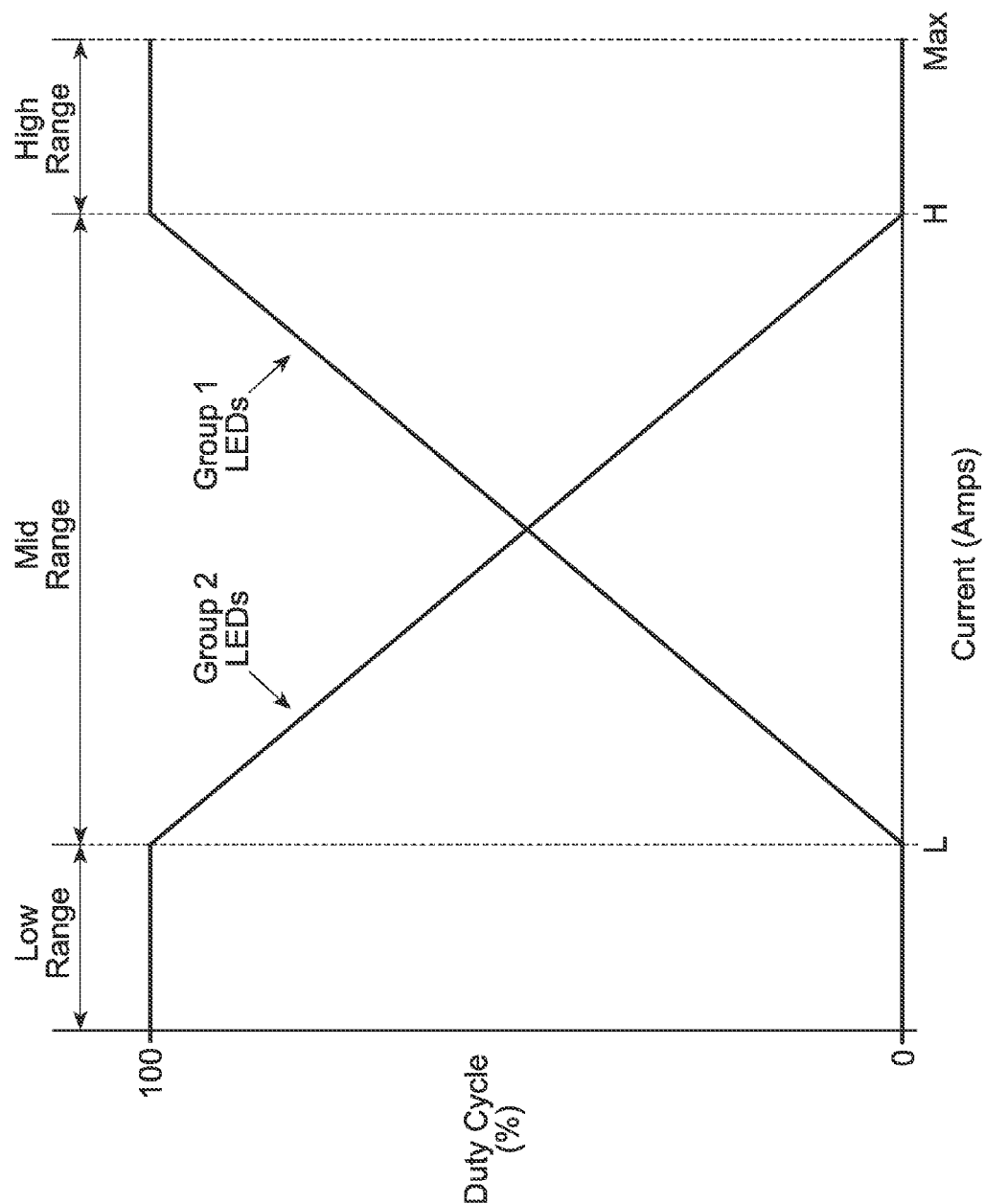
FIG. 11 is a graph depicting the relative duty cycles of a first group of LEDs and a second group of LEDs versus an applied current.

Referring now to FIG. 11, a graph is provided that depicts the operation of the systems described above, including the systems disclosed in FIGS. 1-10 and the related discussions. FIG. 11 depicts, in a somewhat simplified form, the relative duty cycles of a first group of one or more LEDs and a second group of one or more LEDs of a light, versus a current supplied to the light. As discussed above, the system is provided such that a current supplied to the light is varied based on a setting of a dimmer from a Maximum current ("Max"), providing full brightness, to a Minimum current (e.g., 0 or 1%), where the light is off. The variable current is sensed by the system, which in turn, provides a control signal to a controller for providing a modulation signal to control the light source to alter the relative duty cycles of the two groups of LEDs to adjust the perceived color output of the lighting as the current supplied to the lighting changes.

As depicted in FIG. 11, the system includes three current ranges depending upon the dimmer input setting, including a High Range, Mid Range and Low Range. Each range will be discussed in connection with FIG. 11.

High Range.

The High Range is depicted on the right side of the graph in FIG. 11 extending from the Maximum (i.e., brightest) current setting ("Max") to a High Set Point ("H") setting, which is lower than the Maximum current. When the current supplied to the light is at or above the High Set Point (i.e., throughout the High Range), the controller senses the current level and, using that current, the controller drives and illuminates the first group of LEDs in a steady manner, without any pulsing or switching. Further, throughout this range, the controller does not illuminate the second group of LEDs and no switching occurs between the first and second groups of LEDs. Thus, as depicted in FIG. 11, throughout the High Range, the first group of LEDs has a duty cycle of 100% of the period of the timing signal and the second group of LEDs has a duty cycle of 0% of the period.

Preferably, the dimmer provides for infinite adjustment of the current (i.e., without a discrete change) within the High Range, and all other ranges. As the current supplied to the light is adjusted from Maximum down to the High Set Point by the dimmer, the current passing through the first group of LEDs is reduced from Maximum to the High Set Point value in an analog manner thereby decreasing the brightness of the first group of LEDs (and the light) in a linear, analog manner. Therefore, throughout the High Range, the first group of LEDs dims in true analog fashion, between a maximum setting to a predetermined lower setting, as a function of the current.

Preferably, the first group of LEDs produces relatively "cool" or white light (e.g., 2700K), such that, throughout the High Range, the light produces substantially white light. As an example, the Maximum current value can be about 700 mA and the High Set Point can be at about 95-90% of the Maximum current value (e.g., 665-630 mA) such that the light produces substantially white light from a maximal brightness (100%) to a predetermined lesser brightness (e.g., about 90-95% brightness). The second group of LEDs preferably produces a relatively warm light (e.g. 2200K). However, throughout the High Range the second group of LEDs remains off and therefore the second group does not contribute to the perceived color of the light in this range. Thus, the light emulates the essential lack of substantial color change of an incandescent light bulb, during an initial stage of dimming, from a maximum level to a slightly lower level.

Mid Range.

As depicted in FIG. 11, the Mid Range extends between (or from) the High Set Point ("H") and (to) a Low Set Point ("L"), which is less than the High Set Point. When the current supplied to the light is between the High Set Point and the Low Set Point (i.e., throughout the Mid Range), the controller senses the current level and the controller alternately pulses the first and second groups of LEDs, using the current supplied to the light. The first and second groups of LEDs are pulsed at varying duty cycles of the timing signal period, where the duty cycles (and their ratio) are a function of the current supplied to the light source.

Preferably, throughout the Mid Range, the controller provides for infinite adjustment of the respective duty cycles of the first and second groups of LEDs (i.e., without a discrete change) between and including 100% and 0% of the timing signal period. As the current supplied to the light is adjusted from the High Set Point to the Low Set Point in an analog manner, the controller alternately pulses the first and second groups of LEDs using that current and adjusts the relative duty cycles of the first and second groups of LEDs such that the duty cycle of the first group of LEDs changes, in an analog manner, from 100% of the period of the timing signal (at the High Set Point) to 0% (at the Low Set Point). Simultaneously, the controller adjusts the duty cycle of the second group of LEDs in an analog manner from 0% of the period (at the High Set Point) to 100% (at the Low Set Point).

Preferably, as between any two different current levels within the Mid Range, the change in the duty cycle of the first group of LEDs is always inverse (i.e., opposite), but equal in magnitude to, the change in the duty cycle of the second group of LEDs. In other words, throughout the Mid Range, when the duty cycle of the first group of LEDs increases, the duty cycle of the second group of LEDs preferably decreases by the same amount, and vice versa. Further, preferably throughout the Mid Range, the duty cycles of the two groups of LEDs are complementary such that the sum of the duty cycles of the first and second group of LEDs is constant, for example 100% of the period of the timing signal.

As the current supplied to the light is adjusted from the High Set Point to the Low Set Point by the dimmer, the current passing through the light decreases, which decreases the effective brightness of the individual groups of LEDs. However, at the same time, the controller is alternately pulsing the two groups of LEDs during the timing signal period and is adjusting the relative duty cycles of the two groups (i.e., the duty cycle ratio) as a function of the current passing through the light. This is a modulated Time Division Multiplexing (TDM) technique as between the two groups of LEDs. Therefore, at any given current level throughout the Mid Range, the effective brightness of each individual group of LEDs (and thus the color contribution of each group to the overall perceived color of the light) is determined by a hybrid combination of the current level supplied to the light and the modulated TDM technique of the controller. Provided that the luminosity each of the two groups of LEDs is the same or nearly the same at a given current level, the overall brightness of the light is primarily a function of the current level; and the perceived color (change) of the of the light is primarily a function of the modulated TDM technique employed by the controller, which is also related to the current.

In the Mid Range, the aggregate perceived light output from the light is based primarily on three factors: (1) the dimmer setting and the current supplied to the light, (2) the ratio of the duty cycles of the first and second groups of LEDs; and (3) the number of LEDs in each group, provided the forward voltage drop of each of the two groups of LEDs is the same or nearly so.

The Mid Range can occupy about 90 percent of the total current range from Maximum to Minimum current. As an example, the Low Set Point defining a lower limit of the Mid Range can be at about 10-5% of the Maximum current value (e.g., 70 mA-35 mA), such that, within a high limit of about 95-90% (High Set Point) and a low limit of about 10-5% (Low Set Point), the perceived color produced by the light is a varying combination of the relatively cool color of the first group of LEDs and the relatively warmer color of the second group of LEDs. Thus, the light emulates the substantial color change produced by an incandescent light bulb during the majority of dimming, when dimming from a level near the maximum brightness to a level near a minimum brightness.

Low Range.

The Low Range is depicted on the left side of the graph in FIG. 11 extending between (or from) the Low Set Point ("L") and (to) the Minimum current setting (off), which is less than the Low Set Point. As an example, the Minimum can be zero or a very low current (e.g., 0-1% of the Maximum, or 0 mA-7 mA). When the current supplied to the light is at or below the Low Set Point (i.e., throughout the Low Range), the controller senses the current level and, using that current, the controller drives and illuminates the second group of LEDs in a steady manner, without any on/off pulsing. Further, throughout this range, the controller does not illuminate the first group of LEDs and no switching occurs between the first and second groups of LEDs. Thus, as depicted in FIG. 11, throughout the Low Range, the second group of LEDs has a duty cycle of 100% of the period of the timing signal and the first group of LEDs has a duty cycle of 0% of the period.

As the current supplied to the light is adjusted from the Low Set Point to the Minimum setting (e.g., off) by the dimmer, the current passing through the second group of LEDs is reduced from the Low Set Point value to the Minimum in an analog manner thereby decreasing the brightness of the second group of LEDs (and the light) in a linear, analog manner. Therefore, throughout the Low Range, the second group of LEDs dims in true analog fashion, between a predetermined low setting to a Minimum setting (e.g., off), as a function of the current.

As can be appreciated, throughout the Low Range light emanates only from the relatively warmer second group of LEDs so that the light will produce varying brightness levels of relatively warmer color in the Low Range. Also, the first group of LEDs remains off throughout the range and therefore does not contribute to the perceived color. Thus, the light emulates the lack of a substantial color change produced by an incandescent bulb, during the last stages of dimming, from a very low level to a minimum level (or off).

Referring again to FIG. 11, for purposes of clarity, the lines showing the change of the duty cycles of the first and second groups of LEDs within the Mid Range (i.e., between current levels "L" and "H") are depicted as being linear. However, where the modulated TDM technique employs a periodic timing signal and that signal has a (slightly) non-linear shape, the change in each duty cycle with respect to the current may have a corresponding non-linear shape. Therefore, the change of the duty cycles of the first and second groups of LEDs within the Mid Range may differ somewhat from the linear relationship depicted in FIG. 11. Preferably, however, the timing signal is linear or nearly linear (such as the signals produced by the oscillators described above), so for practical purposes, the relationship between the duty cycles and the current can be considered to be approximately linear within the Mid Range. Also, depending on the shape of the timing signal, one of the groups of LEDs might be pulsed one more time than the other group. For example, during a single period of the timing signal, the first group of LEDs could be pulsed on, then the second group of LEDs is pulsed on, and then the first group of LEDs is pulsed on a second time. Further, while the period (and frequency) of the timing signal used in the modulated TDM technique is preferably substantially fixed, a timing signal with an adjustable period is also within the scope of the invention.

As set forth above, the dimmer is preferably operable to provide analog, infinitely variable (i.e., continuous) control of the current in the current ranges, between the Maximum and the Minimum current settings. However, alternatively, the dimmer may provide discrete steps in the current level within the current ranges. Additionally or alternatively, the controller may be operable to provide discrete steps in the duty cycles of the first and second groups of LEDs within the Mid Range in response to the steps in the current level. The discrete steps in the current level and the duty cycles are preferably sufficiently numerous and small that the variation is substantially continuous so that the brightness and perceived color of the light appear to change smoothly and continuously without any noticeable jumps. For example, approximately 256 regular steps in the current would be sufficient to provide the desired effect in the current ranges.

The system provided herein is very adaptable for retrofit installations as it can be utilized with a standard dimmer (e.g. a standard wall-mounted slide-type dimmer) and can utilize the existing wiring that may already be installed in the facility. Furthermore, the system may be provided as a retrofit bulb such that one can simply remove the old light bulb (old lamp) and replace it with a bulb constructed in accordance with this system that will fit into the existing, standard light receptacle or socket. For example, the components of the system, including the LEDs and light engine components, can be housed within a light-transmitting enclosure having the same overall shape as a standard bulb and having a mounting base that is physically and electrically compatible with a standard bulb mount, such as a standard incandescent light bulb with an Edison-mount screw base, or a bulb with a double-contact bayonet base, or a bi-pin base or another type of standard bulb and mount. Thus, such a retro-fit bulb could be used with an existing receptacle, wall dimmer and wiring to provide enhanced lighting features for existing lighting installations.

Figure 12:
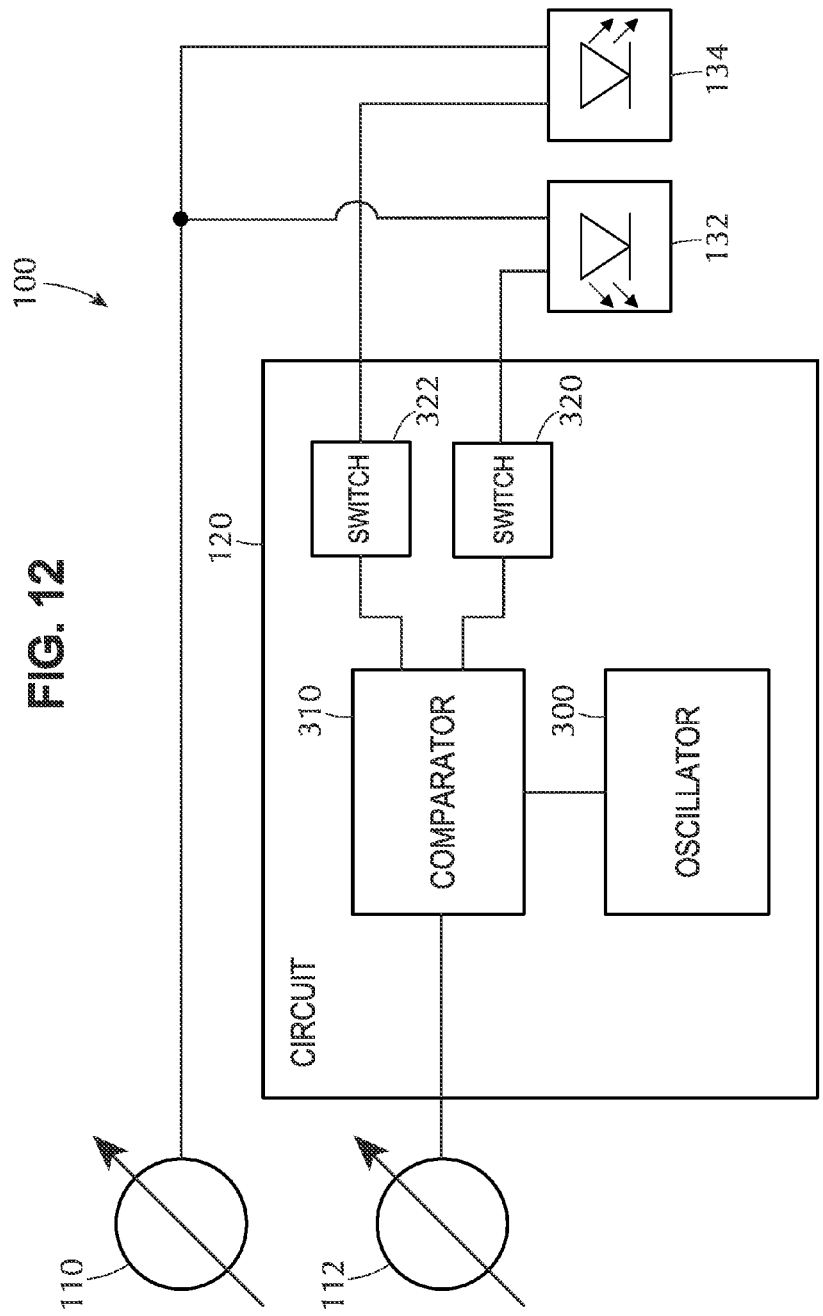
FIG. 12 is block diagram of a lighting system according to the embodiment shown in FIG. 1.

FIG. 12 is a block diagram of another embodiment of circuit 120 in lighting system 100. The circuit 120 includes comparator 310, oscillator 300, switch 320, switch 322, and first and second LED light sources 132, 134, for example, a first group of relatively cool LEDs and a second group of relatively warm LEDs. As discussed in connection with FIG. 3, oscillator 300 produces a periodic signal and may comprise, for example, a relaxation oscillator. In this embodiment, dimmer control 110 and color control 112 are provided for independently controlling the brightness and the perceived color of light emitted by the LED lighting system, respectively.

Each of the controls 110, 112 can comprise a standard dimmer control, such as a wall-mount slide-type dimmer. The setting of dimmer control 110 will control the current supplied to first and second LED light sources 132, 134 to set a brightness level of light emitted by lighting system 100. The setting of color control 112 provides a color control signal to comparator 310. In one embodiment, the color control signal may comprise a voltage signal that may vary from approximately 1V to approximately 5V based on the setting of dimmer 112. Comparator 310 compares the voltage of the color control signal to the voltage of the periodic signal generated by oscillator 300. The switching between the first and second LED light sources 132, 134 to generate a perceived color output is similar to that previously described. For example, when first LED light source 132 is on, second LED light source 134 is off, and vice versa. The on-off time between first and second LED light sources 132. 134 is based on, and is a function of the voltage of the color control signal and not on the brightness setting. In this manner, the color setting is provided independent of the brightness setting.

FIG. 13 shows a more detailed diagram of the embodiment of lighting system 100 depicted in FIG. 12 including current source 400, which is controlled by dimmer 110. Current source 400 is a constant current supply wherein the current level can be varied by dimmer 110, but the current will be constant at a given setting regardless of the load applied. This is similar to the function described in connection with FIG. 4, however, the color control is independent of the brightness control as discussed in connection with FIG. 12.

Figure 14A:
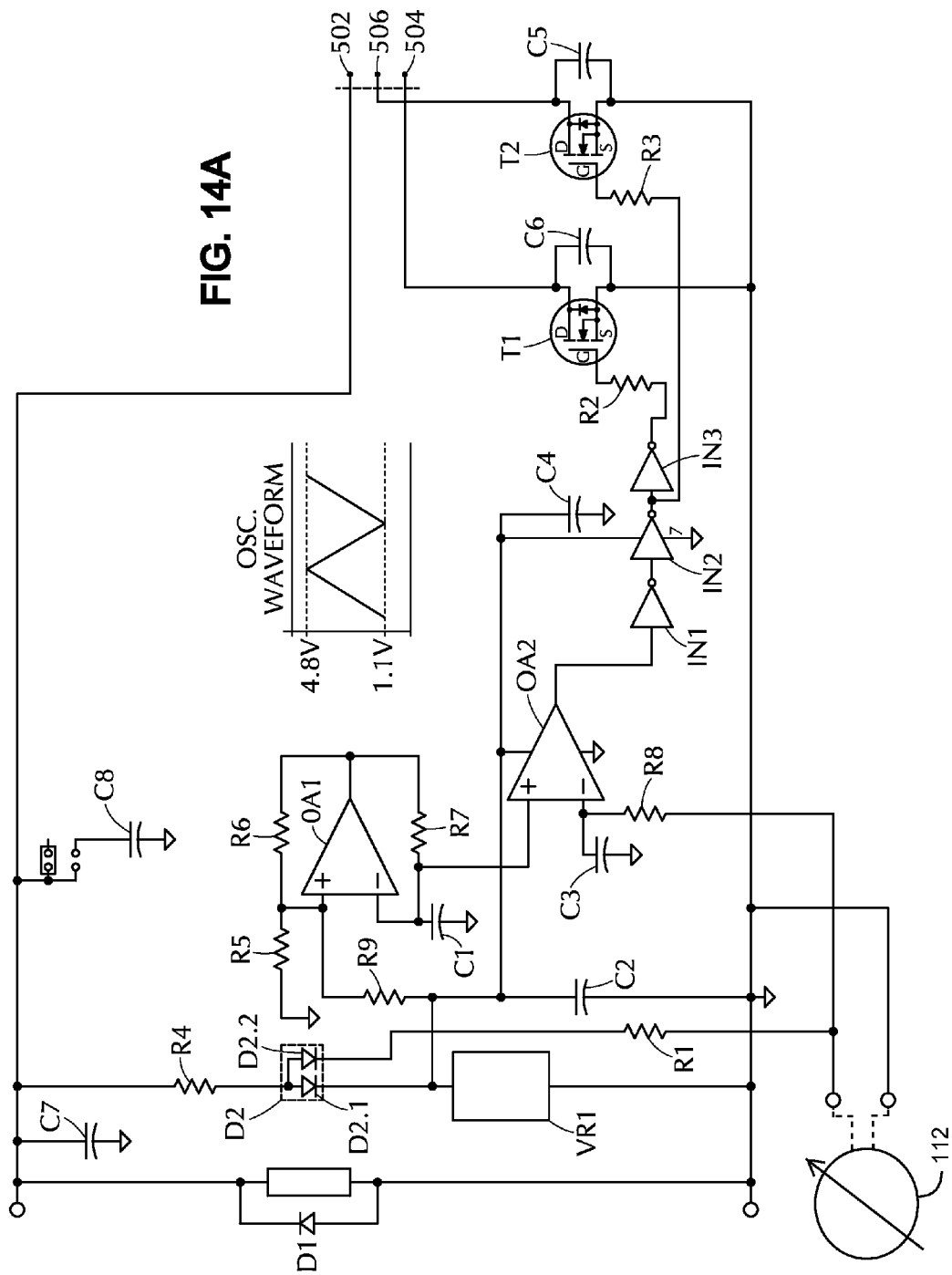

Turning now to FIGS. 14A & 14B, a schematic diagram is provided for circuit 120. Circuit 100 includes a low-pass filter (C3 and R8) positioned on an inverting input of OA2, which alters the rate of change of the voltage applied to the inverting input of OA2. More specifically, when the user adjusts dimmer 112 between two settings at a relatively high rate of change (i.e., the user quickly adjusts the dimmer to a new setting), the voltage applied to the inverting input of op amp OA2 will change at a relatively lower rate due to the low-pass filter resisting the change in voltage coming from the color control signal. In this manner, when a user adjusts dimmer 112 to change the perceived color of the light emitted by lighting system 100, the change in perceived color will occur gradually regardless of how fast the adjustment to dimmer 112 is made.

As in the embodiments described above, inverters IN1, IN2 and IN3 collectively function as an "inverter buffer" so as to buffer the comparator's output. The inverter buffer causes T1 and T2 to behave like switches as the output at IN2 and IN3 will either be fully ON (max voltage) or fully OFF (ground). This is advantageous as the circuit 120 comprises relatively low-power equipment, which is inexpensive, small and efficient. However, low-power equipment can struggle to turn higher power equipment (T1 and T2) ON and OFF. Accordingly, the inverter buffer arraignment provides a relatively strong output signal to drive T1 and T2, while allowing for relatively low-power equipment to be utilized in circuit 120. The output of IN2 provides the increased power signal for driving T2, where IN3 provides an inverted signal to drive T1 in an inverse relationship to T2.

Referring to FIGS. 13 and 14A, a single color control 112 can be used to simultaneously control multiple light fixtures, for example up to 15 fixtures connected in parallel to a single color control 112 (e.g., Circuit 120 and Circuit 2 . . . Circuit N, depicted in FIG. 13). Circuit Protector 324 (FIG. 13 provides protection for each fixture in the event of a failure of one of the connected fixtures. For example, Circuit Protector 324 can comprise D2 (FIG. 14A) enclosing two diodes, D2.1 and D2.2. One diode (D2.1—coupled to VR1) supplies the series regulator, which will have a constant 5V at the cathode side of D2.1. The other diode (D2.2—coupled to R1) will supply the anode voltage common to both diodes (D2.1 and D2.2) so that the cathode of D2.2 will be at approximately 5 V. D2.2 also supplies voltage to the color control interface. If one of fixtures were to fail, for example due to power source or LED driver failure, the color control line (providing the color control signal to the inverting input of OA2) could be loaded down thus causing all the fixtures to dim or go out. If one of the fixtures connected to the common control circuit fails, the diodes (D2.2) in each of the other connected fixtures will block the DC voltage to prevent the voltage from damaging the controllers of the other fixtures so that they are not loaded and also fail.

Figure 15:
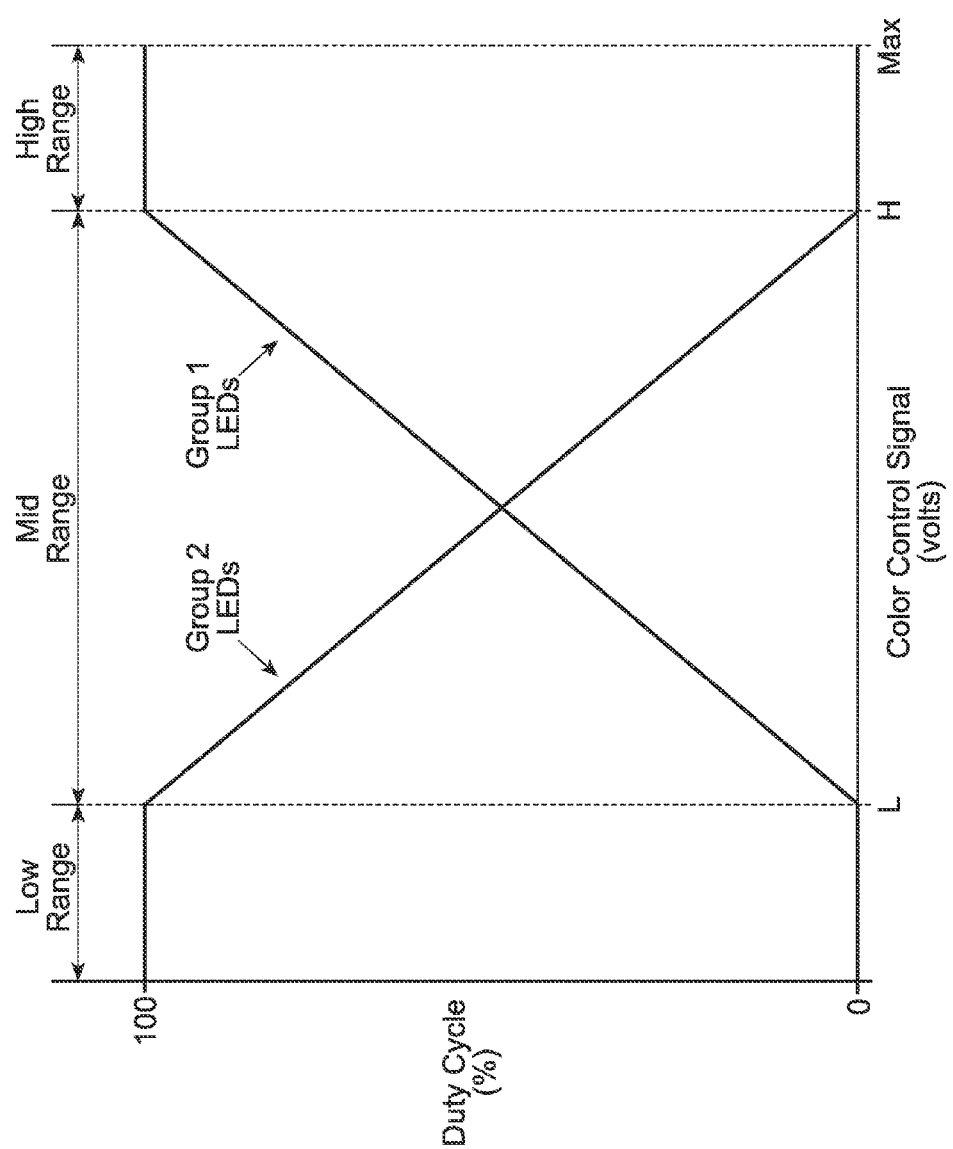
FIG. 15 is a graph depicting the relative duty cycles of a first group of LEDs and a second group of LEDs versus a voltage level of a control signal.

Referring to FIG. 15, the embodiment incorporating the circuit depicted in FIG. 14 operates in a manner similar to that of the aforementioned embodiments, one difference being that the depicted embodiment provides independent control for the brightness and perceived color output, and the color control signal provides a varying voltage to select the desired color output. In particular, the color control signal in the present embodiment has three voltage ranges, namely a High Range, Mid Range and Low Range, which are defined by a Maximum ("Max") level, a High Set Point ("H"), a Low Set Point ("L") and a Minimum. As an example, the High Set Point ("H") can be about 5 volts and the Low Set Point ("L") can be about 1 volt; with the Maximum being a voltage level being above 5 volts and the Minimum being zero or a level below 1 volt.

High Range.

The High Range is depicted on the right side of the graph in FIG. 15 extending from the Maximum color control signal voltage ("Max") to a High Set Point ("H") setting, which is lower than the Maximum voltage. As in the above example, the High Set Point ("H") can be about 5 volts and the Maximum voltage can be a voltage level above 5 volts.

When the color control signal voltage is at or above the High Set Point (i.e., throughout the High Range), the controller senses the voltage signal level and drives the first group of LEDs in a steady manner, without any pulsing or switching. Further, throughout this range, the controller does not illuminate the second group of LEDs and no switching occurs between the first and second groups of LEDs. Thus, as depicted in FIG. 15, throughout the High Range, the first group of LEDs has a duty cycle of 100% of the period of the timing signal and the second group of LEDs has a duty cycle of 0% of the period.

Preferably, the dimmer 112 provides for infinite adjustment of the color control signal (i.e., without a discrete change) within the High Range, and all other ranges. Preferably, the first group of LEDs produces relatively "cool" or white light (e.g., 2700K), such that, throughout the High Range, the light produces substantially white light. The second group of LEDs preferably produces a relatively warm light (e.g. 2200K). However, throughout the High Range the second group of LEDs remains off and therefore the second group does not contribute to the perceived color of the light in this range.

Mid Range.

As depicted in FIG. 15, the Mid Range extends between (or from) the High Set Point ("H") and (to) a Low Set Point ("L"), which is less than the High Set Point. As in the example, the Low Set Point ("L") can be about 1 volt. When the voltage level of the color control signal is between the High Set Point and the Low Set Point (i.e., throughout the Mid Range), the controller senses the voltage signal level and the controller alternately pulses the first and second groups of LEDs. The first and second groups of LEDs are pulsed at varying duty cycles of the timing signal period, where the duty cycles (and their ratio) are a function of the voltage control signal.

Preferably, throughout the Mid Range, the controller provides for infinite adjustment of the respective duty cycles of the first and second groups of LEDs (i.e., without a discrete change) between and including 100% and 0% of the timing signal period. As the voltage level of the color control signal is adjusted from the High Set Point to the Low Set Point in an analog manner, the controller alternately pulses the first and second groups of LEDs and adjusts the relative duty cycles of the first and second groups of LEDs such that the duty cycle of the first group of LEDs changes, in an analog manner, from 100% of the period of the timing signal (at the High Set Point) to 0% (at the Low Set Point). Simultaneously, the controller adjusts the duty cycle of the second group of LEDs in an analog manner from 0% of the period (at the High Set Point) to 100% (at the Low Set Point).

Preferably, as between any two color control signal voltage signal levels within the Mid Range, the change in the duty cycle of the first group of LEDs is always inverse, but equal in magnitude to, the change in the duty cycle of the second group of LEDs. That is, throughout the Mid Range, when the duty cycle of the first group of LEDs increases, the duty cycle of the second group of LEDs preferably decreases by the same amount, and vice versa. Further, preferably throughout the Mid Range, the duty cycles of the two groups of LEDs are complementary such that the sum of the duty cycles of the first and second group of LEDs is constant, for example 100% of the period of the timing signal.

Low Range.

The Low Range is depicted on the left side of the graph in FIG. 15 extending between (or from) the Low Set Point ("L") and (to) the Minimum current setting (off), which is less than the Low Set Point. As an example, the Low Set Point ("L) can be about 1 volt and the Minimum can be zero or a very low current (e.g., 0-1% of the Maximum). When the voltage level of the color control signal is at or below the Low Set Point (i.e., throughout the Low Range), the controller senses the voltage level and drives and illuminates the second group of LEDs in a steady manner, without any on/off pulsing. Further, throughout this range, the controller does not illuminate the first group of LEDs and no switching occurs between the first and second groups of LEDs. Thus, as depicted in FIG. 15, throughout the Low Range, the second group of LEDs has a duty cycle of 100% of the period of the timing signal and the first group of LEDs has a duty cycle of 0% of the period.

Referring again to FIG. 15 (as discussed above regarding FIG. 11), the lines showing the change of the duty cycles of the first and second groups of LEDs within the Mid Range (i.e., between current levels "L" and "H") are depicted as being linear. However, the change of the duty cycles of the first and second groups of LEDs within the Mid Range may differ somewhat from the linear relationship depicted in FIG. 15. Preferably, however, the timing signal is linear or nearly linear (such as the signals produced by the oscillators described above), so for practical purposes, the relationship between the duty cycles and the color control voltage signal can be considered to be approximately linear within the Mid Range. Also, depending on the shape of the timing signal, one of the groups of LEDs might be pulsed one more time than the other group. For example, during a single period of the timing signal, the first group of LEDs could be pulsed on, then the second group of LEDs is pulsed on, and then the first group of LEDs is pulsed on a second time. Further, while the period (and frequency) of the timing signal used in the modulated TDM technique is preferably substantially fixed, a timing signal with an adjustable period is also within the scope of the invention.

As the color control signal is adjusted through any of the ranges, by dimmer 112, the current passing through the LEDs does not change. Provided that the luminosity each of the two groups of LEDs is the same or nearly the same at a given current level, the overall brightness of the light is primarily a function of the current level (as controlled by the dimmer 110); the perceived color (change) of the of the light is a function of color control signal voltage (as controlled by dimmer 112).

The remaining functionality of the circuitry in FIG. 14 is similar to that discussed in connection with FIG. 9 and will not be re-described here. The following table provides the component values for the embodiment shown in FIG. 14.

TABLE 6

Component values for circuit shown in FIG. 14.

| LABEL | COMPONENT |
|---|---|
| VR1 | ZRC500 |
| R1 | 4.99K |
| R2 | 2.21K |
| R3 | 2.21K |
| R4 | 4.75K |
| R5 | 49.9K |
| R6 | 10K |
| R7 | 100K |
| R8 | 100K |
| R9 | 34K |
| D1 | CGRB304-G* |
| D2 | SOT-23** |
| OA1 | LMV342 |
| OA2 | LMV342 |
| C1 | 0.01 µF |
| C2 | 0.1 µF |
| C3 | 1 µF |
| C4 | 0.1 µF |
| C5 | 0.01 µF |
| C6 | 0.01 µF |
| C7 | 0.1 µF |
| C8 | 390 µF |
| T1-T2 | FET |
| IN1-IN3 | HC04 |

*Diode D1 is a general purpose, 3 A, 400 V SMB by Comchip CGRB304-G.
**Diode D2 is a Dual Diode, Common Anode, 75 V, 250 mA by Micro Commerical SOT-23, BAW56 or equal.

The three connections 502, 504, 506 shown on the right hand side of FIG. 14A are connections to first LED light source 132 and second LED light source 134. For example, connection 502 connects to the positive side of both the first and second LED light sources 132 and 134; while connector 504 connects to the negative side of the first LED light source 132; and connector 506 connects to the negative side of the second light source 134.

In a further embodiment, the light source of the light-emitting diode (LED) lighting system has a first group of LEDs operable to produce relatively cool light and a second group of LEDs operable to produce relatively warm light. The first group of LEDs is operable to produce light at a combined color temperature within a range of about 2700K to about 6000K and the second group of LEDs is operable to produce light at a combined color temperature within a range at or below about 2700K (e.g., at or below about 2200K). The difference between the color temperatures of the first and second groups of LEDs is preferably at least about 500K and can be between about 500K and about 4000K. The chromaticity of each group of LEDs and of the light source is preferably within a 2-step MacAdam's Ellipse of the Black Body Locus at the specified color temperature. The LEDs in the first and second groups can be phosphor converted InGaN LEDs or other suitable LEDs. As can be appreciated, the components and function of this embodiment are equally applicable to other the embodiments disclosed above, including embodiments with independent controls for brightness and color and embodiments employing a single control for simultaneous brightness and color control.

In the further embodiment, a controller is coupled to the light source for controlling the first and second groups of LEDs. A color control is coupled to the controller and is operable to generate a variable color control signal. In response to the variable color control signal, the controller is operable to adjust an output of each first and second group of LEDs to vary an overall color of the light source. The color control and controller is operable to adjust the overall color temperature of the light source throughout a range between and including the relatively cool color temperature of the first group of LEDs and the relatively warm color temperature of the second group of LEDs (e.g., from about 2700K or 2800K to about 2200K), and throughout the range, the color control and controller are operable to adjust the overall color temperature of the light source in a smooth and continuous manner, without perceptible steps or jumps.

Although the invention has been described with reference to embodiments herein, those embodiments do not limit the scope of the invention. The specific form of the invention herein illustrated and described is intended to be representative only, as certain changes may be made therein without departing from the clear teachings of the disclosure.

What is claimed is:

1. A lighting system, comprising:
   first and second light sources each comprising a light emitting diode;
   the first light source being operable to generate light having a first color;
   the second light source being operable to generate light having a second color;
   a signal generator operable to generate a timing signal having a period;
   a color control operable to generate a color control signal to adjust a color output of the lighting system;
   a controller coupled to the color control and the signal generator to receive the color control signal, and coupled to the first and second light sources;
   throughout a first range of the color control signal, the controller being operable to alternately pulse the first and second light sources at a rate imperceptible to the human eye to avoid any perceptible flicker such that when the first light source is in one of the on and off states, the second light source is in an opposite one of the on and off states, and being operable to vary the duty cycles of the first and second light sources in a smooth and continuous manner as a function of the color control signal from zero (0) percent to one-hundred (100) percent, where a change in the duty cycle of the first light source is opposite and equal in magnitude to a change in the duty cycle of the second light source;

throughout a second range of the color control signal different than the first range, the controller being operable to illuminate the first light source at a duty cycle of one-hundred (100) percent and to not illuminate the second light source; and throughout a third range of the color control signal different than the first and second ranges, the controller being operable to illuminate the second light source at a duty cycle one-hundred (100) percent and to not illuminate the first light source.

2. The lighting system of claim 1, comprising:
a brightness control operable to control a brightness level of the lighting system independent of the color control; and
the color control does not appreciably change the brightness level of the lighting system.

3. The lighting system of claim 1, comprising:
the lighting system being operable to provide a variable aggregate current driving the first and second light sources; and
the color control signal being derived from the variable aggregate current.

4. The lighting system of claim 1, comprising:
the controller being operable, in response to a change in the color control signal at a first rate, to change the duty cycles of the first and second light sources at a second rate slower than the first rate, to dampen a rate of change of the color output of the light system.

5. The lighting system of claim 1, comprising the color control including a dimmer providing a variable voltage output.

6. The lighting system of claim 1 wherein said controller is operable to pulse the first and second light sources at rates of at least 200 Hz.

7. A lighting system, comprising:
first and second light sources;
a color control operable to generate a color control signal to adjust a color output of the lighting system;
a controller coupled to the color control to receive the color control signal, and coupled to the first and second light sources;
a signal generator coupled to the controller and operable to generate a timing signal;
throughout a first range of the color control signal, the controller being operable to alternately switch the first and second light sources between on and off states such that when the first light source is in one of the on and off states, the second light source is in an opposite one of the on and off states, and being operable to vary the duty cycles of the first and second light sources as a function of the color control signal from zero (0) percent to one-hundred (100) percent, where a change in the duty cycle of the first light source is opposite and equal in magnitude to a change in the duty cycle of the second light source.

8. The lighting system of claim 7, comprising:
throughout a second range of the color control signal different than the first range, the controller being operable to illuminate the first light source for a duty cycle of 100 percent and to not illuminate the second light source; and
throughout a third range of the color control signal different than the first and second ranges, the controller being operable to illuminate the second light source for a duty cycle of 100 percent and to not illuminate the first light source.

9. The lighting system of claim 8, comprising:
a combined range of the color control signal consisting of the first, second and third ranges; and
the first range being about eighty (80) to ninety (90) percent of the combined range.

10. The lighting system of claim 7, comprising:
a brightness control operable to control a brightness level of the lighting system independent of the color control; and
the color control does not appreciably change the brightness level of the lighting system.

11. The lighting system of claim 7, comprising:
the lighting system being operable to provide a variable aggregate current driving the first and second light sources; and
the color control signal being derived from the variable aggregate current.

12. The lighting system of claim 7, comprising:
the controller being operable, in response to a change in the color control signal at a first rate, to change the duty cycles of the first and second light sources at a second rate slower than the first rate, to dampen a rate of change of the color output of the light system.

13. The lighting system of claim 7, comprising:
throughout the first range of the color control signal, the color output of the lighting system substantially following the Black Body Locus.

14. A lighting system, comprising:
first and second light sources, the first light source being operable to generate light having a first color, and the second light source being operable to generate light having a second color;
a color control operable to generate a color control signal to adjust a color output of the lighting system;
a controller coupled to the color control to receive the color control signal, and coupled to the first and second light sources;
a signal generator coupled to the controller and operable to generate a timing signal;
throughout a first range of the color control signal, the controller being operable to pulse the first and second light sources at a rate imperceptible to the human eye to avoid any perceptible flicker between on and off states, and being operable to smoothly and continuously vary the duty cycles of the first and second light sources as a function of the color control signal where a change in the duty cycle of the first light source is opposite to a change in the duty cycle of the second light source and such that the duty cycle of the first light source varies from a first high duty cycle to a first low duty cycle and the duty cycle of the second light source varies from a second high duty cycle to a second low duty cycle;
throughout a second range of the color control signal different than the first range, the controller being operable to illuminate the first light source at the first high duty cycle;
throughout a third range of the color control signal different than the first and second ranges, the controller being operable to illuminate the second light source at the second high duty cycle; and
at least one of the first or second low duty cycles being zero (0) percent.

15. The lighting system of claim 14, comprising:
the first and second low duty cycles being zero (0) percent.

16. The lighting system of claim 14, comprising:
a brightness control operable to control a brightness level of the light fixture independent of the color control; and the color control does not appreciably change the brightness level of the lighting system.

17. The lighting system of claim 14, comprising:
the lighting system being operable to provide a variable aggregate current driving the first and second light sources; and
the color control signal being derived from the variable aggregate current.

18. The lighting system of claim 14, comprising:
the controller being operable, in response to a change in the color control signal at a first rate, to change the duty cycles of the first and second light sources at a second rate slower than the first rate, to dampen a rate of change of the color output of the light system.

19. The lighting system of claim 14 wherein said controller is operable to pulse the first and second light sources at rates of at least 200 Hz.

20. A lighting system, comprising:
first and second light sources;
a signal generator operable to generate a timing signal having a period;
a first control operable to generate a control signal to adjust an output of the lighting system;
a controller coupled to the first control to receive the control signal, and coupled to the signal generator and the first and second light sources;
throughout a first range of the control signal, the controller being operable to pulse the first and second light sources between on and off states and to vary the duty cycle of the first light source as a function of the control signal, from a first high duty cycle to a first low duty cycle;
throughout a second range of the control signal different than the first range, the controller being operable to illuminate the first light source at the first high duty cycle; and
the first high duty cycle being one-hundred (100) percent.

21. The lighting system of claim 20, comprising:
throughout the first range of the control signal, the controller being operable to vary a duty cycle of the second light source as a function of the control signal, from a second high duty cycle to a second low duty cycle, where a change in the duty cycle of the second light source is opposite to a change in the duty cycle of the first light source; and
throughout a third range of the control signal different than the first and second ranges, the controller being operable to illuminate the second light source at the second high duty cycle.

22. The lighting system of claim 21, comprising:
throughout the first range of the control signal, the change in the duty cycle of the second light source is equal in magnitude to the change in the duty cycle of the first light source.

23. The lighting system of claim 20, comprising:
throughout the first range the controller being operable to alternately pulse the first and second light sources between on and off states such that when the first light source is in one of the on and off states, the second light source is in an opposite one of the on and off states.

24. The lighting system of claim 21, comprising:
throughout the first range the controller being operable to vary the duty cycles of the first and second light sources smoothly and continuously between the respective first and second high and low duty cycles.

25. The lighting system of claim 21, comprising:
the first and second high duty cycles being one-hundred (100) percent.

26. The lighting system of claim 21, comprising:
a combined range of the control signal consisting of the first, second and third ranges; and
the first range being about eighty (80) to ninety (90) percent of the combined range.

27. The lighting system of claim 20, comprising:
the first light source being operable to generate light having a first color;
the second light source being operable to generate light having a second color;
the first control being operable to change a color output of the lighting system; and
a second control operable to control a brightness level of the lighting system independent of the first control.

28. The lighting system of claim 27, comprising;
the first control comprising a dimmer providing a variable voltage output.

29. The lighting system of claim 20, comprising:
the lighting system being operable to provide a variable aggregate current driving the first and second light sources; and
the control signal being derived from the variable aggregate current.

30. The lighting system of claim 29, comprising;
the first control being a dimmer providing a variable voltage output.

31. The lighting system of claim 20, comprising:
the controller being operable, in response to a change in the control signal at a first rate, to change the duty cycle of at least the first light source at a second rate slower than the first rate, to dampen a rate of change of the output of the light system.

32. The lighting system of claim 20, comprising:
throughout the first range of the color control signal, the color output of the lighting system substantially following the Black Body Locus.

* * * * *